(12) United States Patent
Furutani et al.

(10) Patent No.: US 9,534,812 B2
(45) Date of Patent: Jan. 3, 2017

(54) SOLAR CONCENTRATOR, AND HEAT COLLECTION APPARATUS AND SOLAR THERMAL POWER GENERATION APPARATUS INCLUDING SAME

(71) Applicant: MITSUBISHI HEAVY INDUSTRIES, LTD., Minato-ku, Tokyo (JP)

(72) Inventors: Akira Furutani, Tokyo (JP); Taizan Furuta, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 236 days.

(21) Appl. No.: 14/369,656

(22) PCT Filed: Feb. 19, 2013

(86) PCT No.: PCT/JP2013/053951
§ 371 (c)(1),
(2) Date: Jun. 27, 2014

(87) PCT Pub. No.: WO2013/129177
PCT Pub. Date: Sep. 6, 2013

(65) Prior Publication Data
US 2015/0000278 A1    Jan. 1, 2015

(30) Foreign Application Priority Data

Feb. 29, 2012  (JP) .................................. 2012-043862
Mar. 28, 2012  (JP) .................................. 2012-074949

(51) Int. Cl.
*F24J 2/54* (2006.01)
*F03G 6/06* (2006.01)
(Continued)

(52) U.S. Cl.
CPC ................ *F24J 2/5427* (2013.01); *F01K 5/02* (2013.01); *F03G 6/06* (2013.01); *F03G 6/064* (2013.01);
(Continued)

(58) Field of Classification Search
CPC ................ F24J 2/5427; F24J 2/38; F24J 2/16; F24J 2/07; F24J 2/542; F24J 2002/5482; F24J 2002/5462; F01K 5/02; F03G 6/064; F03G 6/06; Y02E 10/41; Y02E 10/47; Y02E 10/46
(Continued)

(56) References Cited

U.S. PATENT DOCUMENTS 4,209,236 A    6/1980  Horton et al.
4,264,145 A    4/1981  Urruela
(Continued)

FOREIGN PATENT DOCUMENTS

JP    5541498 A     3/1980
JP    55121208 U    8/1980
(Continued)

OTHER PUBLICATIONS

International Search Report mailed May 14, 2013, corresponding to International application No. PCT/JP2013/053951.
(Continued)

*Primary Examiner* — Hoang Nguyen
(74) *Attorney, Agent, or Firm* — Kanesaka Berner and Partners LLP

(57) ABSTRACT

A center of gravity Q1 of a mirror structure 31, which has a plurality of mirrors 32, is located between the plurality of mirrors 32. A driving mechanism 40 that rotates the mirror structure 31 includes a first rotational shaft 52 that has a first rotational axis A1 as a central axis and is supported by a supporting base 80 to be rotatable, a first drive device 60 that
(Continued)

rotates the first rotational shaft 52, a second rotational shaft 42 that has the mirror structure 31 fixed thereto, has a second rotational axis A2 which is orthogonal to the first rotational axis A1 as a central axis, and is mounted on the first rotational shaft 52 to be rotatable, and a second drive device 45 that rotates the second rotational shaft 42. The center of gravity Q1 of the mirror structure 31 is located in the first rotational shaft 52 and in the second rotational shaft 42.

26 Claims, 27 Drawing Sheets

(51) Int. Cl.
  *F24J 2/07* (2006.01)
  *F24J 2/16* (2006.01)
  *F24J 2/38* (2014.01)
  *F01K 5/02* (2006.01)
(52) U.S. Cl.
  CPC .. *F24J 2/07* (2013.01); *F24J 2/16* (2013.01); *F24J 2/38* (2013.01); *F24J 2/542* (2013.01); *F24J 2002/5462* (2013.01); *F24J 2002/5482* (2013.01); *Y02E 10/41* (2013.01); *Y02E 10/46* (2013.01); *Y02E 10/47* (2013.01)
(58) Field of Classification Search
  USPC ........... 60/641.8–641.15; 126/573, 574, 576, 126/600, 601, 604, 605
  See application file for complete search history.

(56) References Cited

U.S. PATENT DOCUMENTS

| | | | |
|---|---|---|---|
| 4,435,043 A | 3/1984 | Mertens et al. | |
| 4,552,438 A | 11/1985 | Murphy | |
| 5,325,844 A * | 7/1994 | Rogers | F24J 2/10 126/600 |
| 2001/0036024 A1 | 11/2001 | Wood | |
| 2010/0000519 A1* | 1/2010 | Zalusky | F24J 2/38 126/601 |
| 2011/0041834 A1 | 2/2011 | Liao | |
| 2011/0056484 A1* | 3/2011 | Rogers | F24J 2/5427 126/600 |
| 2012/0216538 A1* | 8/2012 | Garaway | F02G 1/055 60/641.14 |

FOREIGN PATENT DOCUMENTS

| | | |
|---|---|---|
| JP | 5835359 A | 3/1983 |
| JP | 5854038 U | 4/1983 |
| JP | 1147407 A | 6/1989 |
| JP | 6213514 A | 8/1994 |
| JP | 2000223730 A | 8/2000 |
| JP | 2001289734 A | 10/2001 |
| JP | 200281760 A | 3/2002 |
| JP | 2002195824 A | 7/2002 |
| JP | 2002228272 A | 8/2002 |
| JP | 200772278 A | 3/2003 |
| JP | 2004037037 A | 2/2004 |
| JP | 2004333003 A | 11/2004 |
| JP | 2009109136 A | 5/2009 |
| JP | 2009198120 A | 9/2009 |
| JP | 2010101462 A | 5/2010 |
| JP | 2010101594 A | 5/2010 |
| JP | 2011163594 A | 8/2011 |
| JP | 2011523775 A | 8/2011 |
| JP | 2011197668 A | 10/2011 |
| JP | 2011257088 A | 12/2011 |
| WO | 2007034717 A1 | 3/2007 |
| WO | 2011052381 A1 | 5/2011 |

OTHER PUBLICATIONS

Written Opinion mailed May 14, 2013, corresponding to International application No. PCT/JP2013/053951.
Office Action mailed on Sep. 15, 2015 corresponding to Australian patent application No. 2013227583.

* cited by examiner

SOLAR CONCENTRATOR, AND HEAT COLLECTION APPARATUS AND SOLAR THERMAL POWER GENERATION APPARATUS INCLUDING SAME

RELATED APPLICATIONS

The present application is a National Phase of International Application Number PCT/JP2013/053951, filed Feb. 19, 2013, which claims priority of Japanese Application Nos. 2012-043862, filed Feb. 29, 2012, and 2012-074949, filed Mar. 28, 2012.

TECHNICAL FIELD

The present invention relates to a solar concentrator that reflects sunlight with a mirror and collects the sunlight at a predetermined concentrating position, and a heat collection apparatus and a solar thermal power generation apparatus including the same.

This application is based on and claims priority under 35 USC 119 from Japanese Patent Application No. 2012-043862 filed Feb. 29, 2012, and Japanese Patent Application No. 2012-074949 filed Mar. 28, 2012, contents of which are incorporated herein by reference.

BACKGROUND ART

In recent years, a number of facilities that use heat energy which is obtained by collecting sunlight as environmentally-friendly clean energy at a predetermined position have been developed.

In the related art, PTLs 1 to 4 below disclose solar concentrators that collect the sunlight at predetermined positions.

The solar concentrator described in PTL 1 includes a mirror structure that has a plurality of mirrors, and a driving mechanism that rotates the mirror structure about two rotational axes with different orientations. The driving mechanism has a first rotational shaft that is parallel with the Earth's axis, a second rotational shaft that extends in a direction which is perpendicular to the first rotational shaft, and a drive device that rotates each of the rotational shafts. A flat plate is fixed to an outer circumferential surface of the first rotational shaft. The second rotational shaft is supported by a bearing, which is disposed on the flat plate, to be rotatable. The mirror structure is fixed to the second rotational shaft.

The solar concentrator described in PTL 2 includes a right ascension axis as a polar axis that is parallel with the Earth's axis, a columnar declination axis that is disposed at a tip end of the right ascension axis, a drive device that rotates each of the right ascension axis and the declination axis, a frame that is mounted on an outer circumferential side of the columnar declination axis, and a mirror that is mounted on the frame via a pin.

The solar concentrator described in PTL 3 includes a mirror structure that has a plurality of mirrors, and a driving mechanism that directs the mirrors of the mirror structure in a desired direction. The mirror structure further has, along with the plurality of mirrors, a laminate sheet that adheres to a back surface of the mirror, a truss structure that is arranged on a back surface side of the laminate sheet, and a spacer piece that is arranged between the laminate sheet and the truss structure to maintain a curved surface of the mirror. A deformable thin mirror is used in the mirror structure to achieve weight reduction, and the mirror is supported, not to be deformed, by the spacer piece and the truss structure which form a rigid body.

The solar concentrator described in PTL 4 also includes a mirror structure that has a mirror. The mirror structure includes the mirror, a plurality of first beams that are curved in conjunction with a desired curved surface of the mirror, and a plurality of second beams that are orthogonal to the plurality of first beams and connect the plurality of first beams with each other.

CITATION LIST

Patent Literature

[PTL 1] JP-A-2010-101462 (FIG. 3)
[PTL 2] JP-A-2004-37037 (FIGS. 3 and 4)
[PTL 3] JP-A-58-35359
[PTL 4] JP-UM-A-58-54038

SUMMARY OF INVENTION

Technical Problem

It is preferable that a driving force and power consumption to rotate the mirrors be minimized in the solar concentrators.

An object of the present invention is to provide a solar concentrator that is capable of reducing a driving force and power consumption to rotate a mirror, and a heat collection apparatus and a solar thermal power generation apparatus including the same.

Solution to Problem

According to an aspect of the present invention, there is provided a solar concentrator including a mirror structure that includes a plurality of mirrors, a driving mechanism that directs sunlight which is reflected by the plurality of mirrors of the mirror structure to a predetermined concentrating position, and a supporting base that supports the driving mechanism, in which a center of gravity of the mirror structure is located between the plurality of mirrors, the driving mechanism includes a first rotational shaft that has a first rotational axis as a central axis and is supported by the supporting base to be rotatable, a first drive device that rotates the first rotational shaft, a second rotational shaft that has the mirror structure fixed thereto, has a second rotational axis which is orthogonal to the first rotational axis as a central axis, and is mounted on the first rotational shaft to be rotatable, and a second drive device that rotates the second rotational shaft, and the center of gravity of the mirror structure is located in the first rotational shaft or in an extension from the first rotational shaft and in the second rotational shaft or in an extension from the second rotational shaft.

In the solar concentrator, the center of gravity of the mirror structure is located in the first rotational shaft or in the extension from the first rotational shaft and in the second rotational shaft or in the extension from the second rotational shaft. Accordingly, a position of the center of gravity of the mirror structure is rarely moved whether the first rotational shaft rotates or the second rotational shaft rotates. Further, a moment to rotate the mirror structure itself about the first rotational axis and the second rotational axis with the weight of the mirror structure itself is rarely generated.

Accordingly, in the solar concentrator, the driving force to rotate the mirror structure can be decreased, and the mirror structure can be stably supported even when the rigidity of the first rotational shaft and the second rotational shaft, the rigidity of a support structure that has a bearing which supports the rotational shafts to be rotatable, and the like are somewhat small.

In the solar concentrator, reflective surfaces of the plurality of mirrors of the mirror structure may form one plane of rotational symmetry and an axis of rotational symmetry of the plane may form an optical axis of the mirror structure, and a principal point on the plane of rotational symmetry, through which the optical axis passes, may be located on a point of intersection between the first rotational axis and the second rotational axis.

When the principal point of the plane of rotational symmetry is located on the point of intersection between the first rotational axis and the second rotational axis, the principal point of the plane of rotational symmetry is a fixed point whether the mirror structure rotates about the first rotational axis or rotates about the second rotational shaft. Accordingly, in the solar concentrator, relative positions of the principal point of the mirror structure and the fixed concentrating position do not change whether the mirror structure is allowed to rotate about the first rotational axis or to rotate about the second rotational axis.

As such, in the solar concentrator, it is possible to accurately continue irradiating a heat receiver with the sunlight that is reflected by the mirror of the mirror structure even when the mirror structure is allowed to rotate.

In addition, in any of the solar concentrators described above, the first drive device may be arranged at a rear side of the first rotational shaft, in a first rotational axis direction apart from the point of intersection between the first rotational axis and the second rotational axis, and may add a rotational driving force to the first rotational shaft. More specifically, the driving mechanism may have one or more bearings that are arranged in the first rotational axis direction to support the first rotational shaft and are supported by the supporting base, and may support the first rotational shaft to be rotatable, and the first drive device may be arranged at a rear side than at least one of the one or more bearings, and may add the rotational driving force to the first rotational shaft. Furthermore, the driving mechanism may further have a front bearing that supports on a front side which is close to the point of intersection of first and second rotational axes to be rotatable in the first rotational shaft, and a rear bearing that supports on the rear side to be rotatable, and the first drive device may be arranged at a rear side than an end of the rear bearing on the front side, and may add the rotational driving force to the first rotational shaft.

In the solar concentrator, the first drive device is located in the vicinity of the point of intersection between the first rotational axis and the second rotational axis. Accordingly, a mutual distance between the plurality of mirrors, where the point of intersection is positioned in the middle, can be shortened, and a moment that is applied to the point of intersection when a wind load is received can be reduced.

In addition, it is preferable that the solar concentrator that includes the rear bearing further include a rear bearing support member that is mounted on the supporting base to support the rear bearing.

In the solar concentrator, a torque that is applied to the first rotational shaft can be supported with the supporting base via a rear bearing support member.

In addition, in any of the solar concentrators described above, it is preferable that the first rotational shaft have a hollow pipe whose center line is the first rotational axis.

In the solar concentrator, the first rotational shaft has the hollow pipe, and thus the weight of the first rotational shaft can be reduced while high rigidity is ensured in the first rotational shaft.

In addition, in any of the solar concentrators described above, the second drive device may be arranged in a radiation direction apart from the point of intersection between the first rotational axis and the second rotational axis.

In the solar concentrator, the second drive device is located in the vicinity of the point of intersection between the first rotational axis and the second rotational axis. Accordingly, the mutual distance between the plurality of mirrors, where the point of intersection is positioned in the middle, can be shortened, and the moment that is applied to the point of intersection when the wind load is received can be reduced.

In addition, in any of the solar concentrators described above, the center of gravity of the mirror structure may be located on a vertically extended line of the supporting base.

In the solar concentrator, the position of the center of gravity of the mirror structure is rarely moved whether the first rotational shaft rotates or the second rotational shaft rotates. Furthermore, the center of gravity is located on a vertically extended line of the supporting base. Accordingly, a bending moment that is applied to an installation surface side of the supporting base by the weight of the mirror structure, that is, an overturning moment of the support base can be reduced.

In addition, in any of the solar concentrators described above, the supporting base may have a frusto-conical shape.

The bending moment that is applied to a lower portion of the installation surface side is greater than the bending moment that is applied to an upper portion of the supporting base. As such, in this solar concentrator, a cross-sectional secondary moment on the installation surface side can be increased by adopting the post with the frusto-conical shape so as to be capable of enduring the relatively greater bending moment that is applied to the installation surface side. Furthermore, in the solar concentrator, the cross-sectional area of the upper portion of the supporting base can be reduced, and thus the movable range of the mirror structure and the movable range of the driving mechanism that rotates the mirror structure can be widened.

In addition, in any of the solar concentrators described above, the supporting base may have a frusto-conical shape, and the center of gravity of the mirror structure may be located in a vertically extended line of a lower surface of the supporting base.

In the solar concentrator, the position of the center of gravity of the mirror structure is rarely moved whether the first rotational shaft rotates or the second rotational shaft rotates. Furthermore, the center of gravity is located in a vertically extended line of the lower surface of the supporting base having the frusto-conical shape. Accordingly, the bending moment that is applied to lower portion side of the supporting base by the weight of the mirror structure, that is, an overturning moment of the support base can be extremely reduced.

In addition, in the solar concentrator that has the post having the frusto-conical shape, the supporting base may further include a rib that is arranged along a generatrix of the base.

In the solar concentrator, the rigidity of the supporting base can be increased.

In addition, in any of the solar concentrators described above, the first drive device may have an actuator as a drive source that has a rod cover and a rod which is linearly driven along to the rod cover, and a link mechanism that has a connection to the rod and the other connection to the first rotational shaft, and drives the first rotational shaft to be rotated by the linear driving of the rod.

In the solar concentrator, the first rotational shaft is allowed to rotate by using the link mechanism. Accordingly, a rotational torque with which the first rotational shaft is allowed to rotate can be increased even when the driving force of the drive source is weak.

Examples of methods for rotating a rotational shaft include a method for rotating a gear with a rotary motor with the gear disposed on an outer circumference of the rotational shaft. According to this method, the rotary motor has to be large in size because a large rotational torque has to be obtained. A method that can be considered in this context is a method for fixing one end of a link to the rotational shaft and oscillating the other end of the link to rotate the rotational shaft, which is described in, for example, JP-A-2007-72278. According to this method, a large rotational torque can be obtained even with a drive source having a weak driving force. However, this method that adopts the link has the problem that a rotation angle range of the rotational shaft becomes narrower due to a limitation in the amount of displacement of the link.

Proposed hereinafter is a device that is capable of obtaining a large rotational torque even with a drive source having a weak driving force and widening a rotation angle range of the rotational shaft.

The solar concentrator according to another aspect of the present invention which is proposed herein is a solar concentrator that includes the link mechanism, in which the link mechanism may be a 4-link mechanism that has a first link piece, a second link piece, a third link piece, and a fourth link piece which are connected with each other, a one end of the first link piece may be connected to the first rotational shaft to rotate each other, a one end of the second link piece may be connected to the other end of the first link piece to rotate each other, a one end of the third link piece may be connected to the other end of the second link piece to rotate each other, a one end of the fourth link piece may be connected to the other end of the third link piece to rotate each other, and the other end of the fourth link piece may be connected to the first rotational shaft not to rotate each other, the first link piece may be fixed to a non-operating part, the rod cover of the actuator may be mounted on the non-operating part to rotate each other, and an end of the rod of the actuator may be connected to the other end of the second link piece to rotate each other, and a distance from the one end to the other end of the fourth link piece may be shorter than a distance from the one end to the other end of the second link piece.

Furthermore, according to another aspect of the present invention which is proposed herein, there is provided a solar concentrator that rotates a mirror structure which includes a mirror about a rotational shaft and directs sunlight which is reflected by the mirror of the mirror structure to a predetermined concentrating position, in which a driving mechanism has the rotational shaft, an actuator that has a rod cover and a rod which is linearly driven along to the rod cover, and a 4-link mechanism that has a first link piece, a second link piece, a third link piece, and a fourth link piece which are connected with each other, in which a one end of the first link piece is connected to the rotational shaft to rotate each other, a one end of the second link piece is connected to the other end of the first link piece to rotate each other, a one end of the third link piece is connected to the other end of the second link piece to rotate each other, and a one end of the fourth link piece is connected to the other end of the third link piece to rotate each other, and the other end of the fourth link piece is connected to the rotational shaft not to rotate each other, the first link piece is fixed to a non-operating part, the rod cover of the actuator is mounted on the non-operating part to rotate each other, and an end of the rod of the actuator is connected to the other end of the second link piece to rotate each other, and a distance from the one end to the other end of the fourth link piece is shorter than a distance from the one end to the other end of the second link piece.

In the driving mechanism, the first rotational shaft is allowed to rotate by using the 4-link mechanism. Accordingly, a rotational torque with which the first rotational shaft is allowed to rotate can be increased even when the driving force of the drive source is weak, and an axial force can be constant regardless of the rotation angle. Furthermore, the link mechanism is used in the solar concentrator, but the rotation angle range of the first rotational shaft can be widened because the special link mechanism is adopted.

In addition, in the solar concentrator that includes the 4-link mechanism, the second link piece may be bent such that a middle portion between the one end and the other end of the second link piece is arranged in the direction away from the first rotational shaft against a line connecting the one end to the other end.

In the solar concentrator, the second link piece can have a wide range of displacement, and thus the rotation angle range of the fourth link piece can be widened. As such, in the solar concentrator, the rotation angle range of the first rotational shaft can be widened.

In addition, in any of the solar concentrators described above, the second drive device may have an actuator as a drive source that has a rod cover and a rod which is linearly driven along to the rod cover, and the rod cover may be mounted on the first rotational shaft to rotate each other such that a linear driving direction of the rod is a direction perpendicular to the second rotational axis, and an end of the rod may be mounted on a position in the radiation direction apart from the second rotational axis in the mirror structure to rotate each other.

In the solar concentrator, the rotational torque with which the second rotational shaft is allowed to rotate can be increased since the driving force from the actuator is added to the position apart from the second rotational axis in the mirror structure. Furthermore, in the solar concentrator, sensitivity of positioning accuracy of the actuator that is linearly driven can be reduced with respect to positioning accuracy of the rotation angle, and thus the positioning accuracy of the rotation angle can be improved.

In addition, any of the solar concentrators described above may further include an elevation changing structure that changes an angle of the first rotational shaft with respect to a horizontal plane.

In many cases, a plurality of the solar concentrators are disposed in a heat collection apparatus. In this case, a plurality of heat collectors have relative positions with respect to the concentrating position, and thus the angle of the first rotational shaft with respect to the horizontal plane needs to be changed. The solar concentrator includes the elevation changing structure, and thus is capable of changing the angle of the first rotational axis with respect to the horizontal plane for each of the plurality of solar concentrators in a case where the plurality of solar concentrators are disposed.

In addition, in the solar concentrator that includes the elevation changing structure, the second drive device may have a predetermined rotation angle range of the second rotational shaft based on the first rotational shaft, and the elevation changing structure may change the angle of the first rotational shaft with respect to the horizontal plane between a face-down state where one side of the first rotational shaft is not higher than the other side and a state where the one side is higher than the other side.

In the solar concentrator, the angle range that is to scheduled to be used can be included within the angle range at which the mirror rotates about the second rotational axis even when the angle range at which the mirror rotates about the second rotational axis is limited.

The mirror structure described in PTL 3 supports the mirror with the spacer piece and the truss structure and the mirror structure described in PTL 4 supports the mirror with the plurality of beams that extend horizontally and vertically with respect to the mirror, which leads to weight increase. Accordingly, these mirror structures cannot facilitate transport and on-site assembly and have the problem that the driving force is increased when the mirror structure is directed in a desired direction.

Proposed hereinafter is a device that is capable of facilitating transport and on-site assembly by allowing the mirror structure to be small in size and light in weight and reducing the driving force when the mirror structure is directed in a desired direction.

According to another aspect of the present invention which is proposed herein, there is provided a solar concentrator according to any of the solar concentrators described above, in which the mirror structure may further have, along with the plurality of mirrors, rear plates that support respective back surfaces of the plurality of mirrors and a supporting frame that supports back surfaces of the rear plates, and the reflective surfaces of the plurality of mirrors of the mirror structure may form the one plane of rotational symmetry, the axis of rotational symmetry of the plane may form the optical axis of the mirror structure, and the supporting frame may have a plurality of support beam members that extend in the radiation direction with respect to the optical axis to support the rear plates.

Furthermore, according to another aspect of the present invention which is proposed herein, there is provided a solar concentrator including a mirror structure that has one or more mirrors, in which sunlight is reflected by the mirrors of the mirror structure, and the sunlight is collected at a predetermined concentrating position by a heat collector, the mirror structure further has, along with the one or more mirrors, rear plates that support respective back surfaces of the one or more mirrors and a supporting frame that supports back surfaces of the rear plates, and reflective surfaces of the one or more mirrors of the mirror structure form one plane of rotational symmetry, an axis of rotational symmetry of the plane forms an optical axis of the mirror structure, and the supporting frame has a plurality of support beam members that extend in a radiation direction with respect to the optical axis to support the rear plates.

In the solar concentrator, the plurality of support beam members, which support the rear plates, extend in the radiation direction with respect to the optical axis of the mirror structure, that is, extend in a direction in which the curvature of the mirror changes. As such, the mirrors and the rear plates can be supported very efficiently. Accordingly, in the solar concentrator, the number of components of the supporting frame can be decreased and a lightweight member can be used as a member that constitutes the supporting frame.

As such, the mirror structure can be light in weight according to the solar concentrator.

Herein, in the solar concentrator that includes the supporting frame, the mirror structure may include the plurality of mirrors, the supporting frame may have a connection member that connects the support beam members, which support respective back surface supporting rear plates of the plurality of mirrors, with each other, and the optical axis may be present between the plurality of mirrors.

In the solar concentrator, the rotational shaft, on which the rotation is based, can be arranged between the plurality of mirrors in a case where the mirror structure is allowed to rotate about the optical axis.

In addition, the solar concentrator that includes the supporting frame may further include a driving mechanism that rotates the mirror structure respectively about a first rotational axis and a second rotational axis which are orthogonal to each other, in which the driving mechanism may have a first rotational shaft that has the first rotational axis as a central axis to be rotatable, a second rotational shaft that has the mirror structure fixed thereto, and is mounted on the first rotational shaft such that the second rotational shaft has the second rotational axis as a central axis to be rotatable, and a drive device that rotates each of the first rotational shaft and the second rotational shaft.

In this case, a point of intersection between the first rotational axis and the second rotational axis may be positioned on a point of the plane of rotational symmetry through which the optical axis passes.

When the point of intersection between the first rotational axis and the second rotational axis is positioned on the point of the plane of rotational symmetry through which the optical axis passes, the above-described point of the plane of rotational symmetry is a fixed point whether the mirror structure rotates about the first rotational axis or rotates about the second rotational shaft. Accordingly, in the solar concentrator, relative positions of the above-described point of the mirror structure and a fixed heat receiver do not change whether the mirror structure is allowed to rotate about the first rotational axis or to rotate about the second rotational axis.

Accordingly, in the solar concentrator, it is possible to accurately continue irradiating the heat receiver with the sunlight that is reflected by the mirror of the mirror structure even when the mirror structure is allowed to rotate.

In addition, in the solar concentrator that includes the supporting frame and the drive device, a center of gravity of the mirror structure may be located in the first rotational shaft or in an extension from the first rotational shaft and in the second rotational shaft or in an extension from the second rotational shaft.

In the solar concentrator, the position of the center of gravity of the mirror structure is rarely moved whether the mirror structure is allowed to rotate about first rotational axis or to rotate about the second rotational shaft. Furthermore, a moment to rotate the mirror structure itself about the first rotational axis and the second rotational axis with the weight of the mirror structure itself is rarely generated.

As such, according to the solar concentrator, the driving force to rotate the mirror structure can be decreased, and the mirror structure can be stably supported even when the rigidity of the first rotational shaft and the second rotational shaft, the rigidity of a support structure that has a bearing which supports the rotational shafts to be rotatable, and the like are somewhat small.

In addition, in the solar concentrator that includes the supporting frame, the mirror may form a polygonal plate shape, and the support beam member may extend from the optical axis toward a corner of the mirror.

Each corner that is formed on each side relatively away from the optical axis by the mirror with the polygonal plate shape is basically arranged in the direction away from the optical axis against the sides. Accordingly, when the support beam member extends toward such a corner, the mirror can be supported efficiently.

In addition, in the solar concentrator that includes the supporting frame, a cross-sectional area of the support beam member that is perpendicular to the radiation direction, in which the support beam member extends, at a position away from the optical axis may be smaller than a cross-sectional area at a position close to the optical axis.

In a case where the support beam member that extends in the radiation direction with respect to the optical axis is disposed, a part that is away from the optical axis receives a less moment from the mirror and the rear plate than a part that is close to the optical axis in the support beam member. As such, according to the solar concentrator, the mirror structure can be further light in weight while the rigidity of the mirror structure can be ensured.

In addition, in any of the solar concentrators described above, the center of gravity of the mirror structure may be positioned on the optical axis.

In the solar concentrator, the center of gravity of the mirror structure is not moved in a case where the mirror structure is allowed to rotate about the optical axis, and thus the driving force that is required for the rotation can be decreased.

In addition, according to another aspect of the present invention to achieve the above-described object, there is provided a heat collection apparatus including any of the solar concentrators described above, and a heat receiver that heats a medium with sunlight which is collected by the solar concentrator.

According to another aspect of the present invention to achieve the above-described object, there is provided a solar thermal power generation apparatus including any of the solar concentrators described above, a heat receiver that heats a medium with sunlight which is collected by the solar concentrator, a turbine that is driven by the medium which is heated by the heat receiver, and a power generator that generates power when the turbine is driven.

Advantageous Effects of Invention

According to the present invention, the position of the center of gravity of the mirror structure is rarely moved whether the first rotational shaft rotates or the second rotational shaft rotates. Furthermore, the moment to rotate the mirror structure itself about the first rotational axis and the second rotational axis with the weight of the mirror structure itself is rarely generated.

As such, according to the present invention, the driving force to rotate the mirror structure can be decreased, and the mirror structure can be stably supported even when the rigidity of the first rotational shaft and the second rotational shaft, the rigidity of a support structure that has a bearing which supports the rotational shafts to be rotatable, and the like are somewhat small.

In addition, according to the present invention relating to the solar concentrator that includes the supporting frame, the mirror structure can be small in size and light in weight. As such, according to the present invention, the transport and the on-site assembly can be facilitated, and the driving force can be reduced when the mirror structure is directed in the desired direction.

BRIEF DESCRIPTION OF DRAWINGS

FIG. 7 is a view illustrating a mirror structure according to embodiment of the present invention, in which FIG. 7A is a rear view of the mirror structure, FIG. 7B is a bottom view of the mirror structure, and FIG. 7C is a cross-sectional side view of the mirror structure.

DESCRIPTION OF EMBODIMENTS

Hereinafter, an embodiment of a heat collection apparatus that includes a solar concentrator according to the present invention will be described in detail with reference to the accompanying drawings. The embodiment below is a preferred specific example of the solar concentrator and the heat collection apparatus according to the present invention, and the present invention is not limited to the aspect of this embodiment. In addition, components of this embodiment described below may be appropriately replaced with existing components and may be subject to various variations, including combinations with other existing components. Accordingly, the description of the embodiment below does not limit the subject matter of the invention described in the scope of claims.

Figure 1:
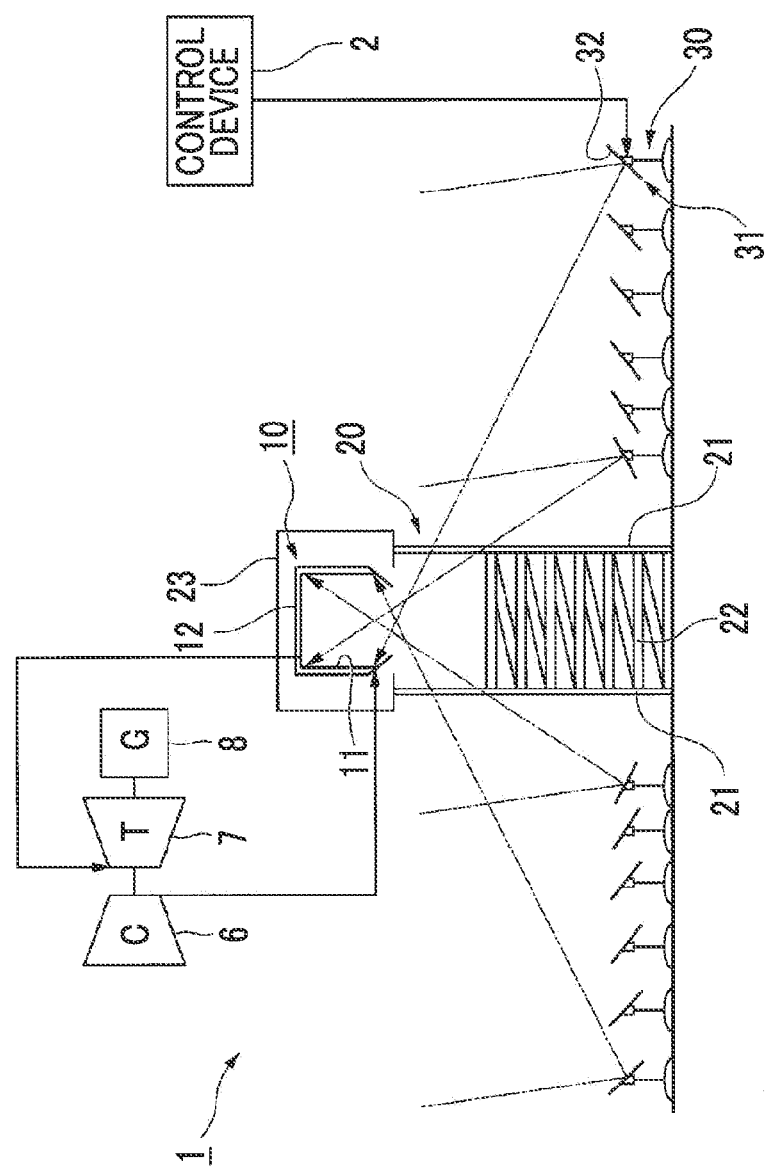
FIG. 1 is an explanatory view illustrating a configuration of a heat collection apparatus according to an embodiment of the present invention.

As illustrated in FIG. 1, a heat collection apparatus 1 according to this embodiment includes a heat receiver 10 that is irradiated with sunlight, a tower facility 20 where the heat receiver 10 is fixed to an upper portion, a plurality of heliostats 30 as solar concentrators that reflect the sunlight with mirrors 32 and irradiates the heat receiver 10 with the sunlight, and a control device 2 that controls the plurality of heliostats 30.

The heat receiver 10 has a heat receiving portion 11 that is irradiated with the sunlight, and a casing 12 that covers the heat receiving portion 11. A working fluid such as water and air is supplied into the heat receiving portion 11, and the working fluid is heated by heat from the sunlight. In a case where the working fluid is the air, the heat collection apparatus 1 can constitute a solar thermal power generation apparatus by further having an air compressor 6 that compresses the air and supplies the air to the heat receiver 10, a turbine 7 that is driven by the air which is heated with the heat receiver 10, and a power generator 8 that generates power when the turbine 7 is driven. In this example, heat energy from the heat receiver 10 is used to generate electric energy. However, the heat energy may be used to generate steam, and the steam may be used to generate the electric energy.

Figure 2:
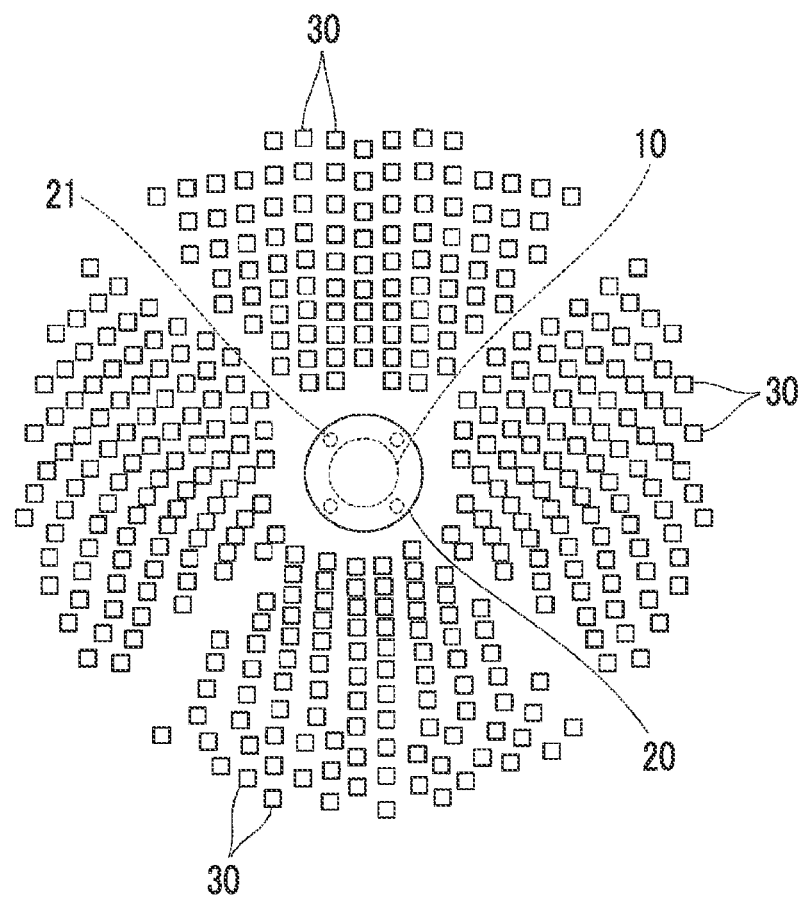
FIG. 2 is a plan view of the heat collection apparatus according to the embodiment of the present invention.

As illustrated in FIG. 2, the plurality of heliostats 30 are dotted in a ring-shaped area about the tower facility 20. In other words, the plurality of heliostats 30 are arranged 360° in a circumferential direction about the tower facility 20, and are arranged also in a perspective direction based on the tower facility 20. Herein, the plurality of heliostats 30 are arranged in the ring-shaped area about the tower facility 20. However, the plurality of heliostats 30 may be arranged in a fan-shaped area or in a rectangular area about the tower facility 20.

As illustrated in FIG. 1, the tower facility 20 has four posts 21 that extend in a vertical direction, a plurality of beams 22 that connect the four posts 21 with each other, and a housing chamber 23 that houses the heat receiver 10. The posts 21 and the beams 22 of the tower facility 20 are arranged not to present on an optical path of the sunlight that is reflected by the mirrors 32 of the heliostats 30 and is directed to the heat receiver 10.

As illustrated in FIGS. 3 to 6, the heliostat 30 has a mirror structure 31 that has the mirror 32 which reflects the sunlight, a driving mechanism 40 that directs the mirror 32 of the mirror structure 31 in a desired direction, and a supporting base 80 that supports the mirror structure 31 and the driving mechanism 40. The driving mechanism 40, as described in detail later, is a device that rotates the mirror structure 31 about each of a first rotational axis A1 and a second rotational axis A2, which are orthogonal to each other.

Figure 7:
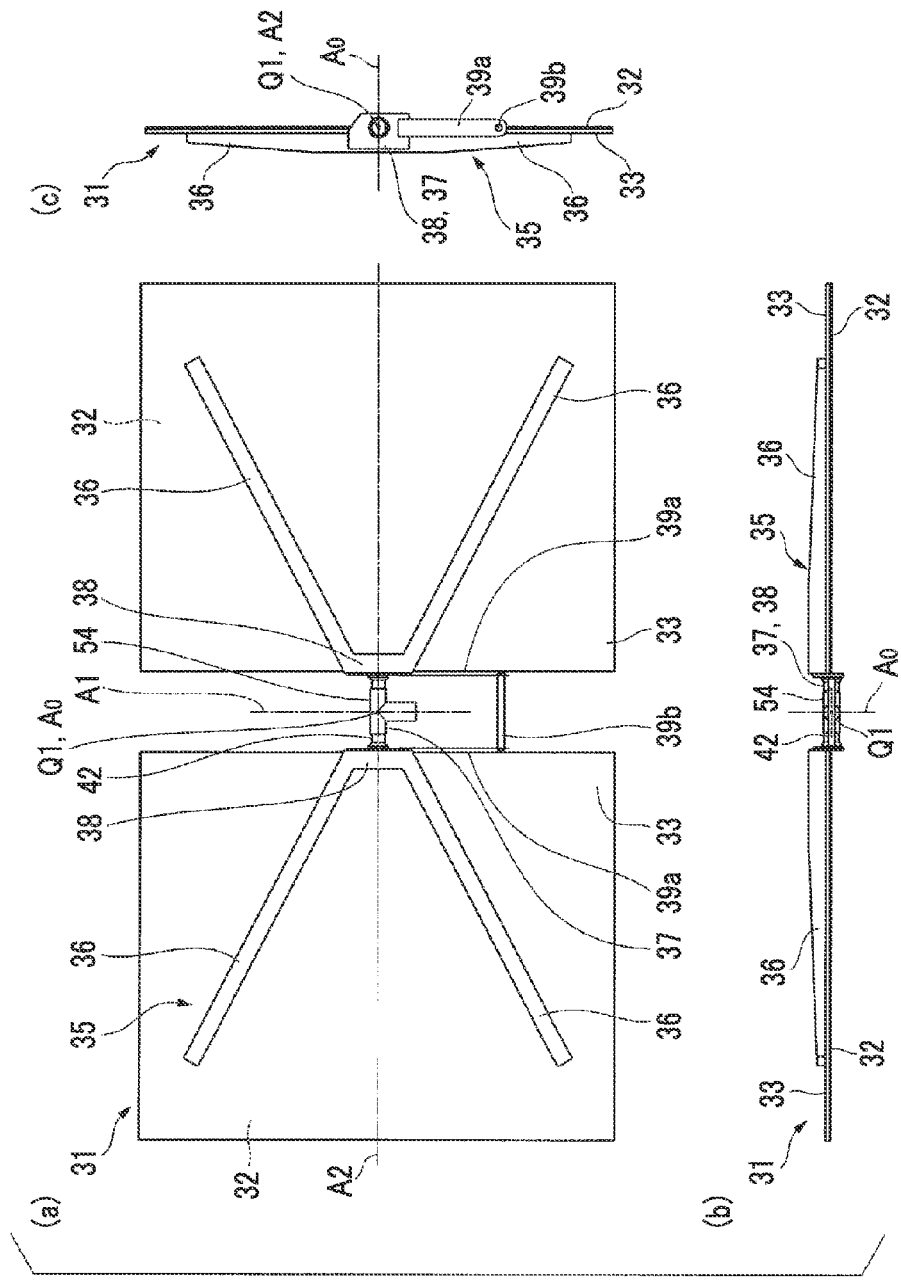

As illustrated in FIG. 7, the mirror structure 31 has the two mirrors 32, a rear plate 33 that adheres to back surfaces of the respective mirrors 32, and a supporting frame 35 that supports back surface of the rear plate 33.

Figure 8:
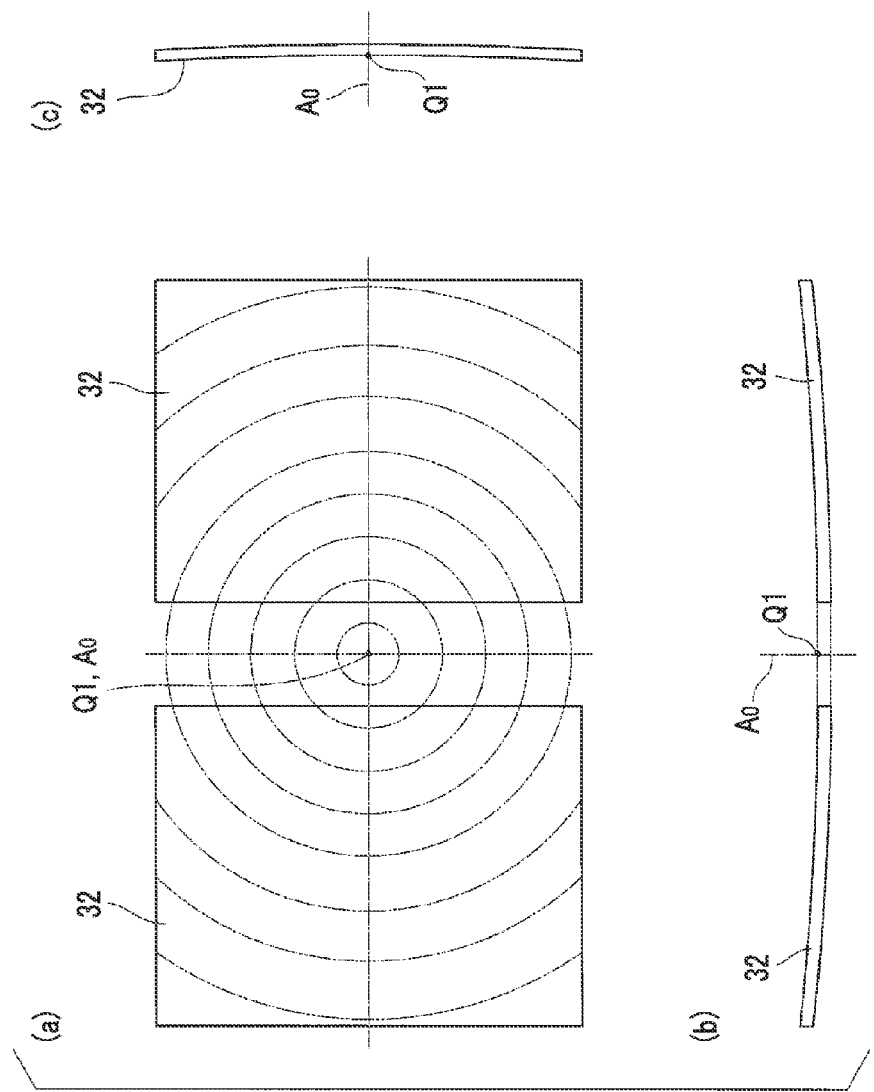
FIG. 8 is an explanatory view illustrating a mirror according to the embodiment of the present invention.

As illustrated in FIG. 8, the two mirrors 32 have the same size and form the same oblong plate shape. In the mirror structure 31 of this embodiment, reflective surfaces of the two mirrors 32 form one rotationally symmetric curved surface, specifically, a paraboloid of revolution. A vertex of the paraboloid of revolution is positioned at a middle point of the two mirrors 32. In this embodiment, the vertex of the paraboloid of revolution is a principal point Q1 of the mirror structure 31, and an axis that extends in a normal direction with respect to the reflective surface through the principal point Q1, that is, an axis of rotational symmetry of the rotationally symmetric curved surface is an optical axis Ao of the mirror structure 31.

As described above, the rear plate 33 adheres to each of the entire back surfaces of the two mirrors 32. The rear plate 33 is formed of a thin steel plate, a thin aluminum alloy plate, a resin plate, and the like, and is molded to form a concave-convex shape in a plate thickness direction thereof. The rear plate 33 adheres to the back surface of the mirror 32 via an adhesive in a top portion of a convex portion of the concave-convex shape. It is preferable that the adhesive, which adheres at least a part of the mirror 32 and the rear plate 33 with each other, is, for example, a silicon-based elastic adhesive or a modified silicon-based elastic adhesive having elasticity so as to absorb a thermal expansion difference caused by a difference between the coefficient of thermal expansion of the mirror 32 and the coefficient of thermal expansion of the rear plate 33. The supporting frame 35 is bonded, by welding or adhesion, to a part of the rear plate 33 that is relatively concave with respect to the convex portion.

The supporting frame 35 has a plurality of support beam members 36, and a connection member 37 that connects the plurality of support beam members 36 with each other. The support beam member 36 has a groove-like or a square pipe-like cross-sectional shape. In addition, the thickness of the support beam member 36 decreases as the support beam member 36 is away from the optical axis Ao of the mirror structure 31, that is, toward a corner side of the rear plate 33 to be light in weight. The plurality of support beam members 36 are bonded to the rear plate 33 such that a longitudinal direction thereof is directed in a radiation direction from the optical axis Ao of the mirror structure 31. Specifically, in this embodiment, the two support beam members 36 are disposed with respect to the one rear plate 33. One end of each of the support beam members 36 is directed to the optical axis Ao side and the other end is directed to the corner side of the rear plate 33, that is, a corner side of the mirror 32 such that the two support beam members 36 disposed on the rear plate 33 form a V shape. Herein, the two support beam members 36 are disposed with respect to the one rear plate 33, that is, the one mirror 32. However, three or more support beam members 36 may be disposed in view of strength. In addition, the width of the support beam member 36 may decrease (tapered) as the support beam member 36 is away from the optical axis Ao of the mirror structure 31. In other words, the cross-sectional area of the support beam member 36 that is perpendicular to the radiation direction, in which the support beam member 36 extends, may be smaller at a position away from a optical axis Po than at a position close to the optical axis Po.

The connection member 37 has a connection beam 38 that connects the two support beam members 36 of the one rear plate 33 with each other, a cylindrical shaft 42 that connects the connection beam 38 on the one rear plate 33 side and the connection beam 38 on the other rear plate 33 side with each other, a T pipe 54 into which the shaft 42 is inserted, an arm plate 39a that has one end fixed to the connection beam 38 and extends along an edge of the rear plate 33, and a spacing rod 39b that connects the end of the arm plate 39a on the one rear plate 33 side and the end of the arm plate 39a on the other rear plate 33 side with each other.

Figure 3:
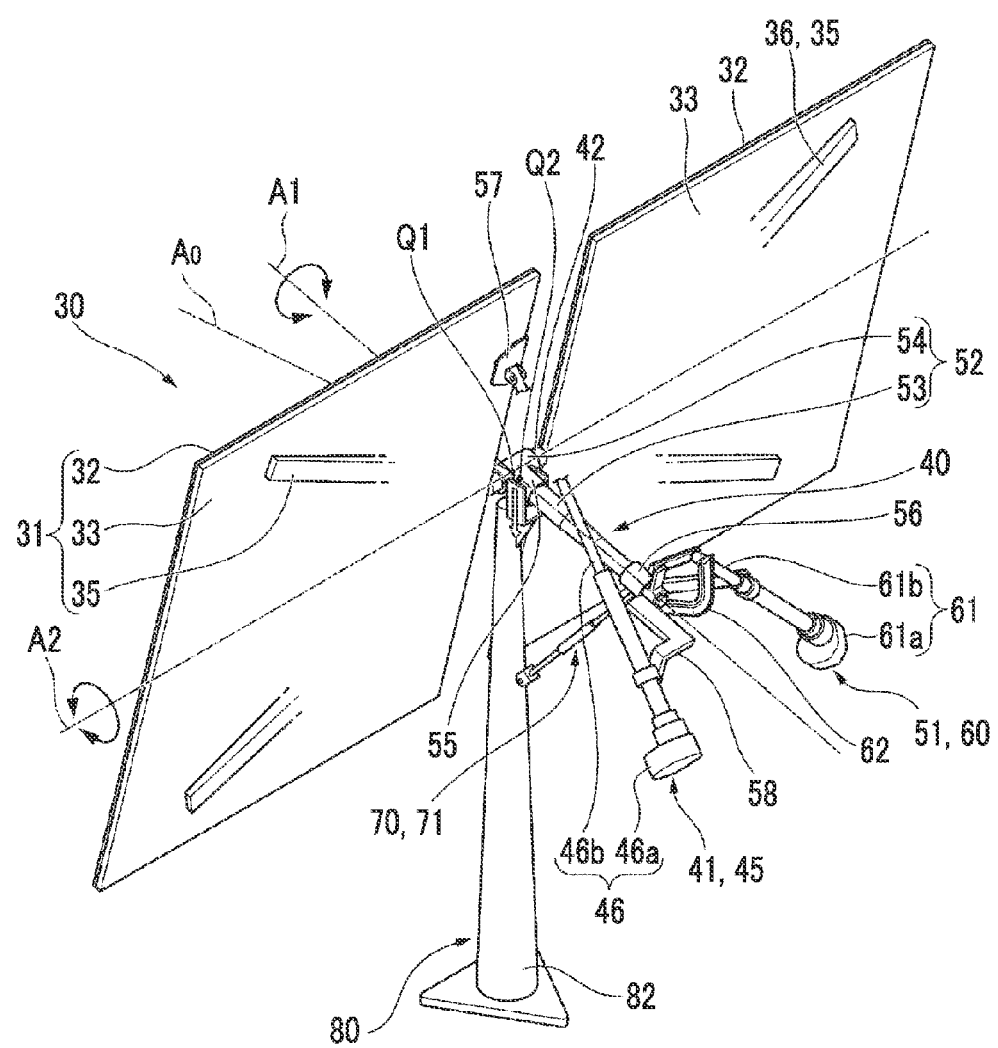
FIG. 3 is a schematic perspective view of a heliostat according to the embodiment of the present invention.
Figure 4:
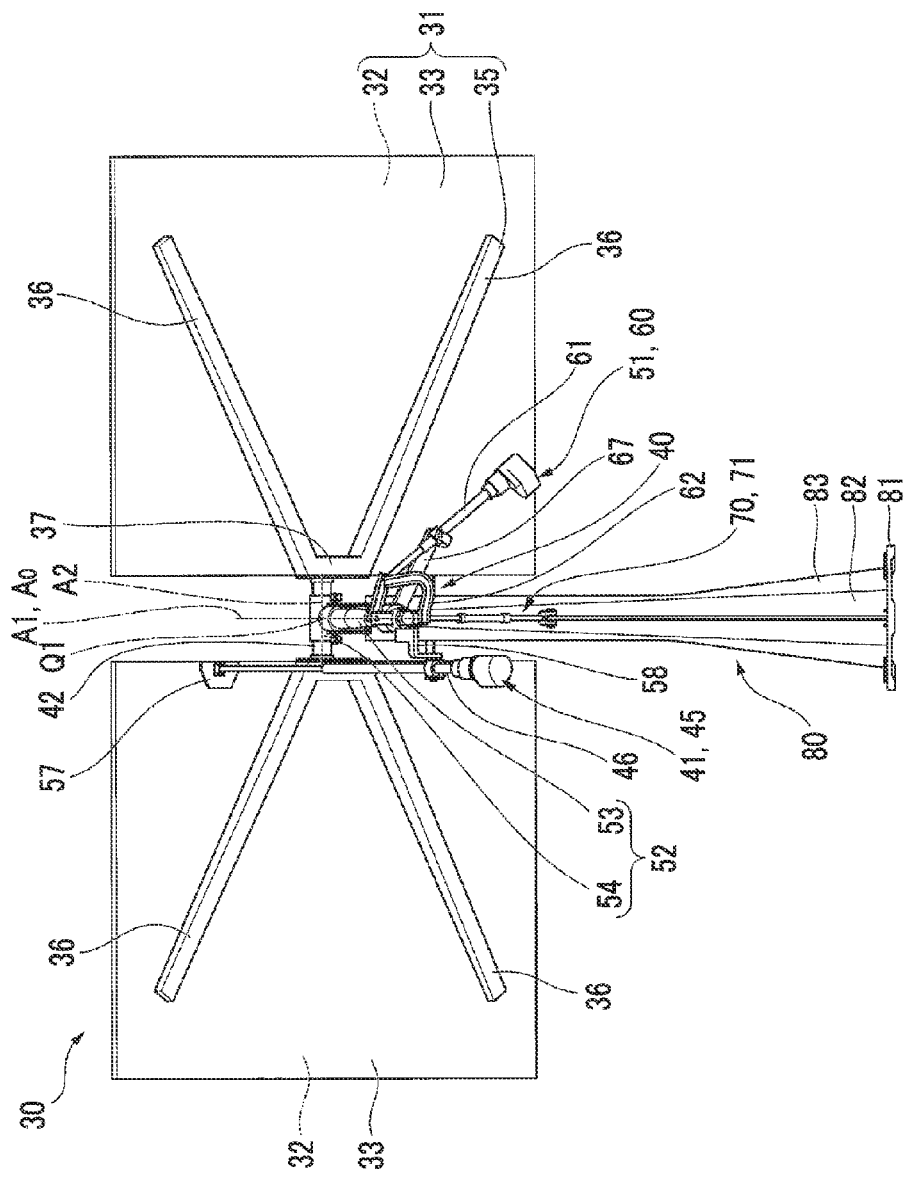
FIG. 4 is a rear view of the heliostat according to the embodiment of the present invention.
Figure 9:
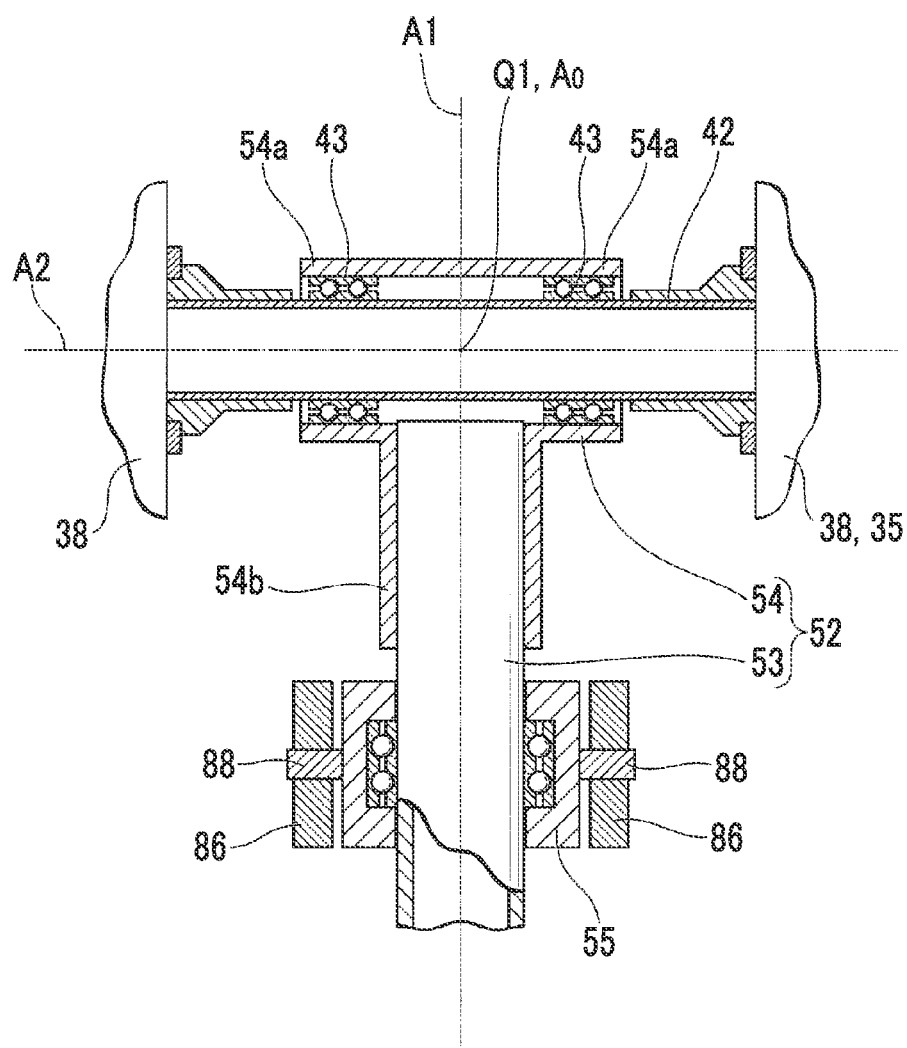
FIG. 9 is a cross-sectional view around each rotational shaft according to the embodiment of the present invention.
Figure 10:
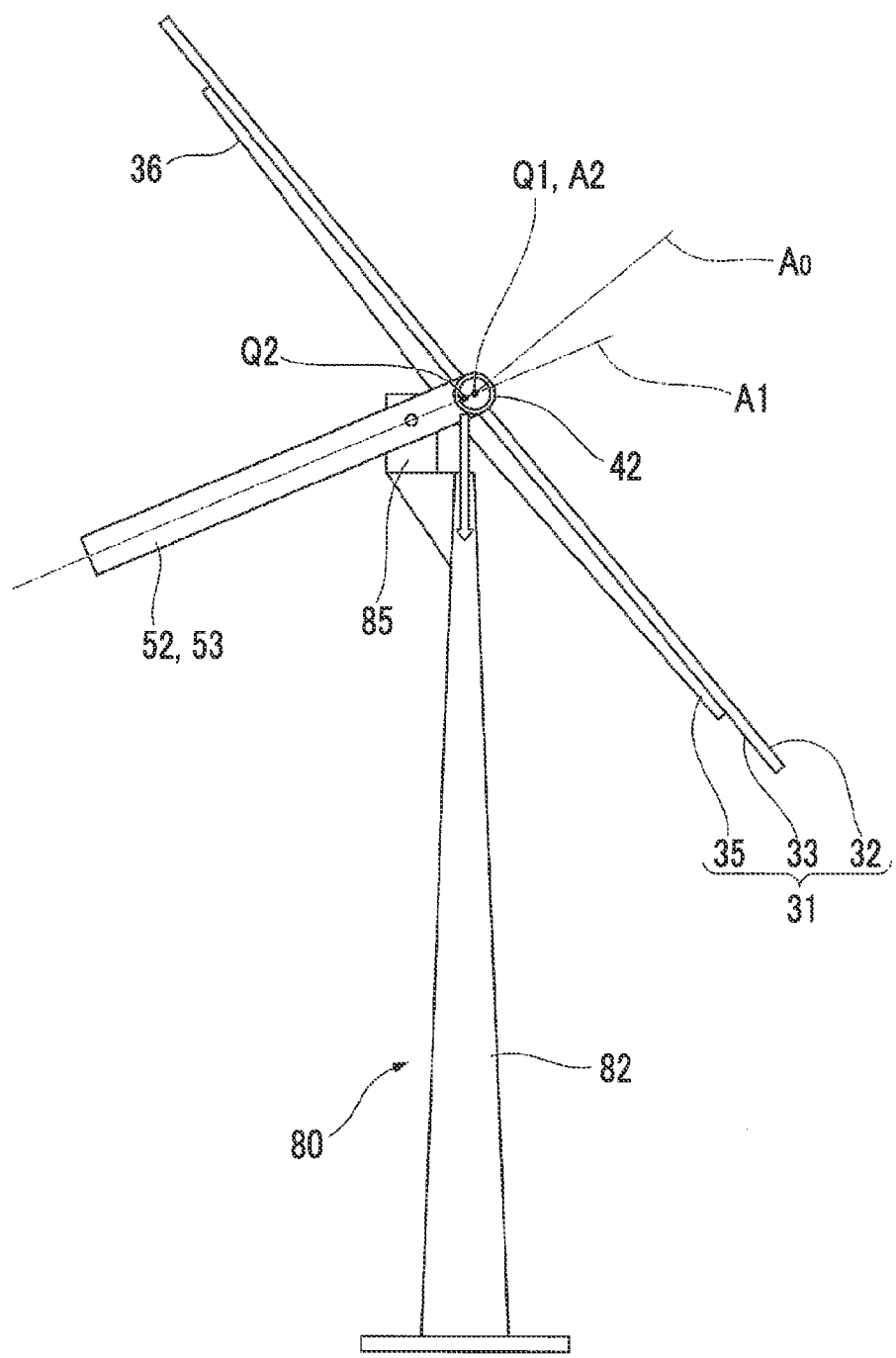
FIG. 10 is an explanatory view illustrating a mutual relationship of an optical axis, a center of gravity, and each rotational axis of the mirror structure according to the embodiment of the present invention.

As illustrated in FIGS. 3 and 10, a central axis of the shaft 42 that connects the connection beams 38 with each other is orthogonal to the optical axis Ao through the principal point Q1, which is the vertex of the paraboloid of revolution of the mirror structure 31. In addition, the shaft 42 is formed as a hollow pipe as illustrated in FIG. 9. The shaft 42 is put into a part 54a of the T pipe 54 that corresponds to a horizontal line, and is supported to be rotatable about the central axis of the shaft 42 by a bearing 43 that is disposed in the T pipe 54. In this embodiment, the shaft 42 forms a second rotational shaft, and the central axis of the shaft 42 forms the second rotational axis A2. As such, the shaft is hereinafter referred to as the second rotational shaft 42.

As illustrated in FIG. 7, each of the arm plates 39a extends in a direction that is perpendicular to the second rotational shaft 42, and the one end of the arm plate 39a is fixed to the connection beam 38 as described above. The other end of the one of the two arm plates 39a and the other end of the other arm plate 39a are connected with each other by the spacing rod 39b as described above. The spacing rod 39b extends in a direction that is parallel with the second rotational shaft 42.

In this embodiment, a shaft of the connection member 37 forms the second rotational shaft 42, and the central axis of the shaft forms the second rotational axis A2 as described above. In addition, the first rotational axis A1 that is orthogonal to the second rotational axis A2 is also through the principal point Q1, which is a vertex of a paraboloid of the mirror structure 31, as is the case with the second rotational axis A2 as illustrated in FIGS. 3 and 10. In other words, in this embodiment, a point of intersection between the first rotational axis A1 and the second rotational axis A2 matches with the principal point Q1 of the mirror structure 31.

As illustrated in FIGS. 3 to 6, the driving mechanism 40 has a first driving unit 51 that rotates each of the mirrors 32 about the first rotational axis A1, a second driving unit 41 that rotates each of the mirrors 32 about the second rotational axis A2, and an elevation changing structure 70 that changes an angle of the first rotational shaft with respect to a horizontal plane.

The second driving unit 41 has the above-described second rotational shaft 42 whose central axis is the second rotational axis A2, the above-described bearing 43 (FIG. 9) that supports the second rotational shaft 42 to be rotatable about the second rotational axis A2, and a second drive device 45 that rotates each of the mirrors 32 about the second rotational axis A2. The second drive device 45 has a second linear actuator (second drive source) 46. The second linear actuator 46 has a rod cover 46a, and a rod 46b that is linearly driven along to the rod cover 46a. The second linear actuator 46 is arranged at a position in the radiation direction apart from the second rotational shaft 42 such that a linear direction of the rod 46b is perpendicular to the second rotational axis A2. A tip end of the rod 46b is pin-coupled with a strike plate 57 that is disposed in the mirror structure 31. The strike plate 57 is disposed at a position in the radiation direction apart from the second rotational axis A2 on the back surface of the one rear plate 33 of the mirror structure 31.

The first driving unit 51 has a first rotational shaft 52 whose central axis is the first rotational axis A1 that is orthogonal to the second rotational axis A2 through the principal point Q1, two bearings 55 and 56 that support the first rotational shaft 52 to be rotatable about the first rotational axis A1, and a first drive device 60 that rotates each of the mirrors 32 about the first rotational axis A1.

The first rotational shaft 52 has a first rotational shaft main body 53 whose central axis is the first rotational axis A1, and the T pipe 54 that is a part of the connection member 37 of the mirror structure 31. The first rotational shaft main body 53 is formed as a hollow pipe. The second rotational shaft 42 is put into the part 54a of the T pipe 54 that corresponds to the horizontal line as is already described with reference to FIG. 9, and is supported to be rotatable about the second rotational axis A2 by the bearing 43 that is disposed in the T pipe 54. In addition, an end of the first rotational shaft main body 53 is fitted into a part 54b of the T pipe 54 that corresponds to a vertical line such that the first rotational shaft main body 53 is fixed. In other words, the T pipe 54 serves as a shaft connection member that connects the second rotational shaft 42 and the first rotational shaft main body 53 with each other.

In this manner, the shaft 42 and the T pipe 54 of the connection member 37, which is a component of the mirror structure 31, is also a component of the driving mechanism 40 in this embodiment.

A position on one side of the first rotational shaft main body 53 in a first rotational axis direction, in which the first rotational axis A1 extends, that is, a position on a rear side away from the T pipe 54 is supported by the rear bearing 56, which is one of the two bearings 55 and 56 described above. In addition, a position on the other side of the first rotational shaft main body 53 in the first rotational axis direction, that is, a position on a front side close to the T pipe 54 is supported by the front bearing 55, which is the other one of the two bearings 55 and 56. Both the front bearing 55 and the rear bearing 56 are mounted, as described later, on the supporting base 80 or a member that extends from the supporting base 80 to be supported.

A second actuator support beam 58 is disposed at an end on a further rear side than the rear bearing 56 on the rear side of the first rotational shaft main body 53. The rod cover 46a (refer to FIG. 3) of the second linear actuator 46 is pin-connected to an end of the second actuator support beam 58. Accordingly, the second linear actuator 46 rotates about the first rotational axis A1, integrally with the first rotational shaft 52, when the first rotational shaft 52 rotates about the first rotational axis A1.

Hereinafter, an operation of the second driving unit 41 will be described.

As described above, the second linear actuator 46 is arranged at the position in the radiation direction apart from the second rotational axis A2 such that the linear direction of the rod 46b is perpendicular to the second rotational axis A2. Accordingly, the mirror structure 31 that is connected to the tip end of the rod 46b rotates about the second rotational axis A2 when the rod 46b is linearly driven. In this case, the second rotational shaft 42 of the second driving unit 41 rotates about the second rotational axis A2.

Figure 27A:
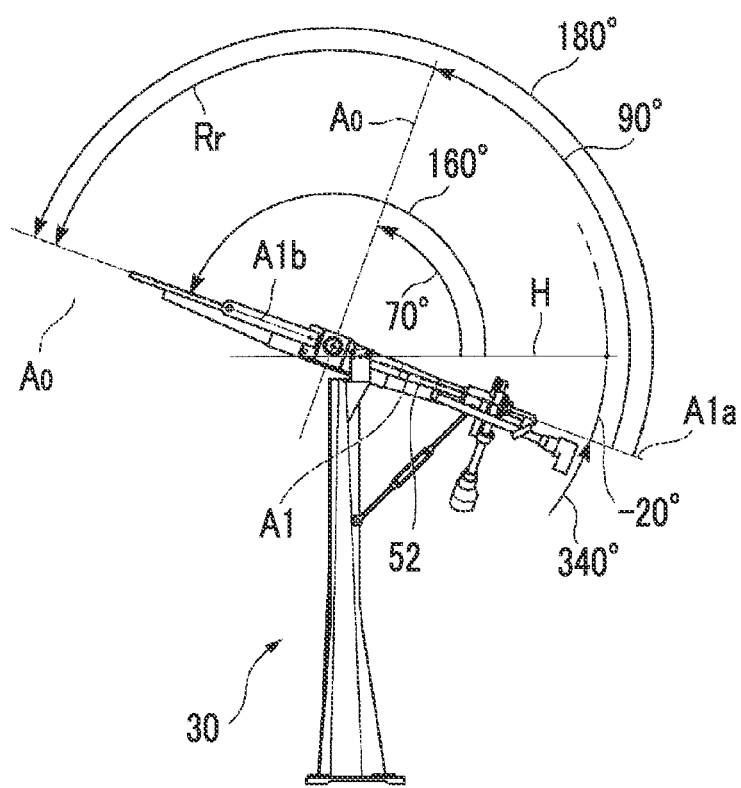
FIG. 27A is an explanatory view illustrating a rotation angle range at a time when a second rotational shaft according to the embodiment of the present invention is in a face-down state.
Figure 27B:
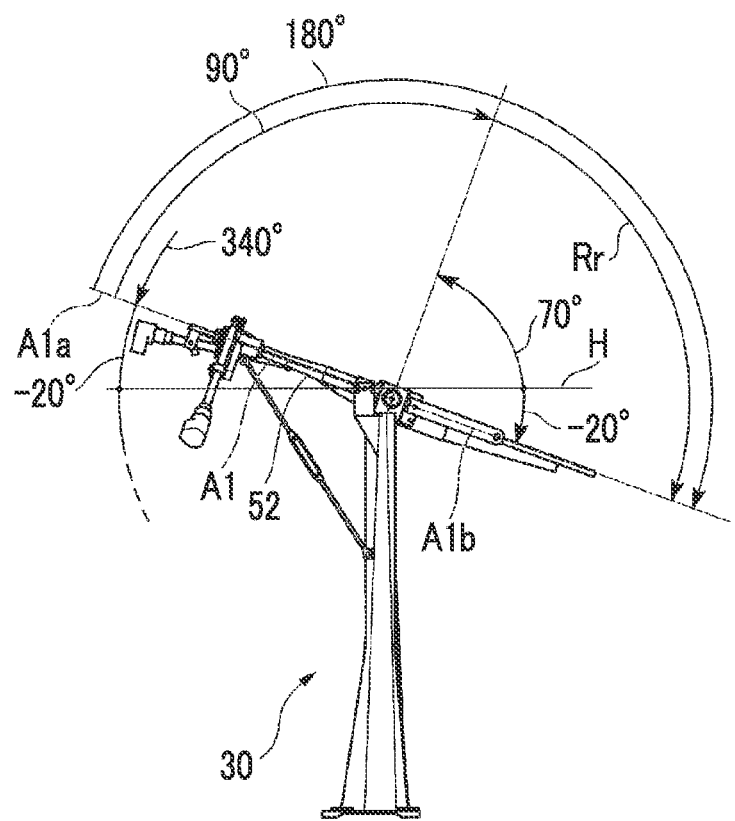
FIG. 27B is an explanatory view illustrating the rotation angle range at a time when the second rotational shaft according to the embodiment of the present invention is in a face-up state.

In this embodiment, the second linear actuator 46 that is mounted on the first rotational shaft 52 causes the mirror structure 31 to rotate about the second rotational axis A2. Accordingly, a rotation angle range of the mirror structure 31 about the second rotational axis A2, that is, a rotation angle range of the second rotational shaft 42 is an angle range based on the first rotational shaft 52, which is less than 180°. Specifically, the rotation angle range of the second rotational shaft 42 according to this embodiment is, for example, 90° from an angle of approximately 90° of the optical axis Ao, which is perpendicular to the second rotational shaft 42, with respect to the first rotational shaft 52 to an angle of approximately 180° with respect to the first rotational shaft 52 as illustrated in FIGS. 27A and 27B.

The first driving unit 51 will be described again. As illustrated in FIGS. 3 to 6, the first drive device 60 of the first driving unit 51 is arranged at a position on a further rear side than the end of the rear bearing 56 on the front side, and adds a rotational driving force to a part on a further rear side than the rear bearing in the first rotational shaft. The first drive device 60 has a first linear actuator (first drive source) 61, and a 4-link mechanism 62 as illustrated in FIGS. 11 to 16.

The 4-link mechanism 62 has a first link piece 63, a second link piece 64, a third link piece 65, and a fourth link piece 66 that are connected with each other. One end 63a of the first link piece 63 is fixed to the rear bearing (non-operating part) 56, and one end 64a of the second link piece 64 is pin-connected to rotate each other to the other end 63b of the first link piece 63. In addition, one end 65a of the third link piece 65 is pin-connected to rotate each other to the other end 64b of the second link piece 64, and one end 66a of the fourth link piece 66 is pin-connected to rotate each other to the other end 65b of the third link piece 65. The other end 66b of the fourth link piece 66 is fixed to the first rotational shaft 52.

The first linear actuator 61 has a rod cover 61a, and a rod 61b that is linearly driven along to the rod cover 61a. A first actuator support beam 67, which extends in the radiation direction with respect to the first rotational axis A1, is disposed in the rear bearing 56. The rod cover 61a of the first linear actuator 61 is pin-connected to rotate each other to an end of the first actuator support beam (non-operating part) 67.

The second link piece 64 is bent into an L shape, and a middle portion between the one end 64a and the other end 64b of the second link piece 64 is arranged in the direction away from the first rotational shaft 52 against a line that connects the one end 64a and the other end 64b with each other. A distance from the one end 66a to the other end 66b of the fourth link piece 66, that is, the link length of the fourth link piece 66, is shorter than a distance from the one end 64a to the other end 64b of the second link piece 64, that is, the link length of the second link piece 64.

Hereinafter, an operation of the first driving unit 51 will be described.

Figure 11:
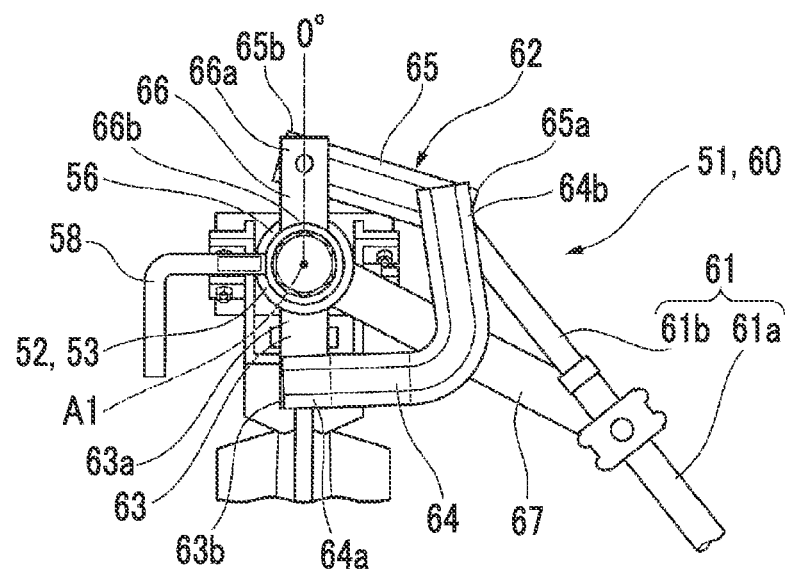
FIG. 11 is a rear view of a first drive device according to the embodiment of the present invention (rotation angle of a first rotational shaft being 0°).
Figure 12:
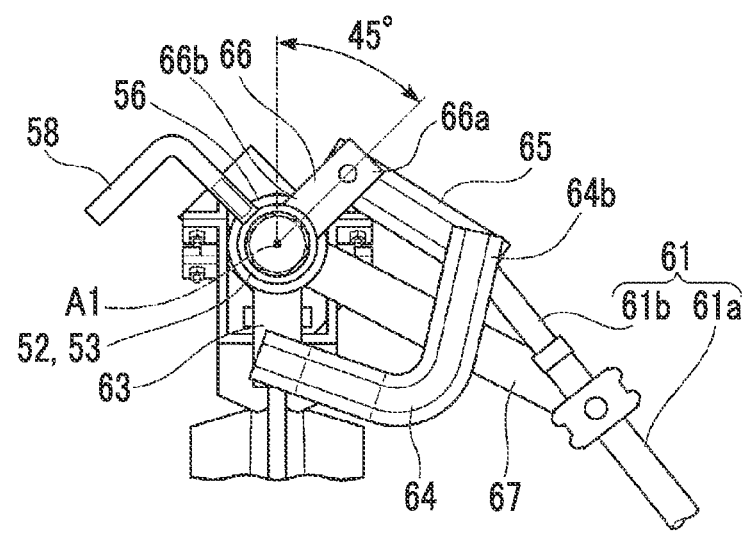
FIG. 12 is a rear view of the first drive device according to the embodiment of the present invention (rotation angle of the first rotational shaft being 45°).

As illustrated in FIG. 11, the rotation angle of the first rotational shaft 52 at a time when the fourth link piece 66 extends vertically upward from the first rotational shaft 52 is 0°. When the rod 61b of the first linear actuator 61 is linearly driven from this state in a direction in which the rod 61b is put into the rod cover 61a, the other end 64b is displaced due to the linear driving of the rod 61b as illustrated in FIG. 12 such that the second link piece 64 oscillates about the one end 64a in a clockwise direction in the drawing. The third link piece 65 that is connected to the second link piece 64 is moved in a substantially clockwise direction due to the oscillation of the second link piece 64. When the third link piece 65 is moved in the substantially clockwise direction, the one end 66a of the fourth link piece 66 is displaced in the clockwise direction due to the movement of the third link piece 65. As a result, the first rotational shaft 52 that is fixed to the other end 66b of the fourth link piece 66 rotates in the clockwise direction about the first rotational axis A1.

Figure 13:
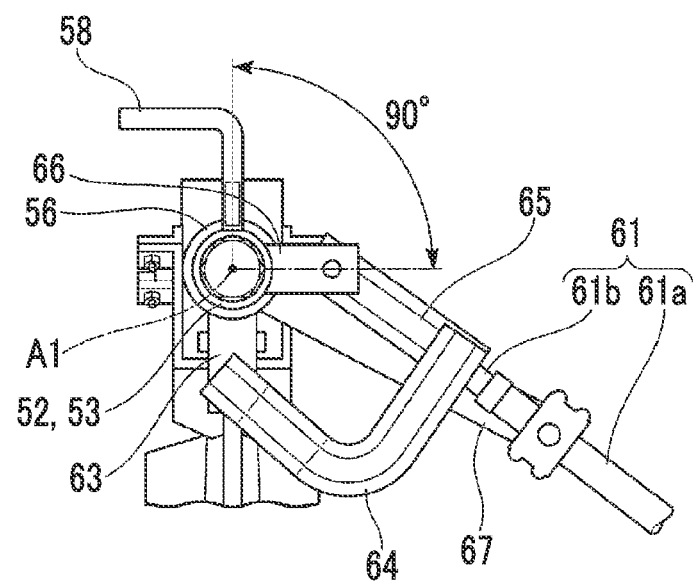
FIG. 13 is a rear view of the first drive device according to the embodiment of the present invention (rotation angle of the first rotational shaft being 90°).

When the rod 61b of the first linear actuator 61 is further linearly driven from the state illustrated in FIG. 12 in the direction in which the rod 61b is put into the rod cover 61a, the first rotational shaft 52 further rotates in the clockwise direction through the same process as described above as illustrated in FIG. 13. In this embodiment, the state illustrated in FIG. 13 is a state where the maximum rotation angle of the first rotational shaft 52 in the clockwise direction is formed. The maximum rotation angle is, for example, 90°.

Figure 14:
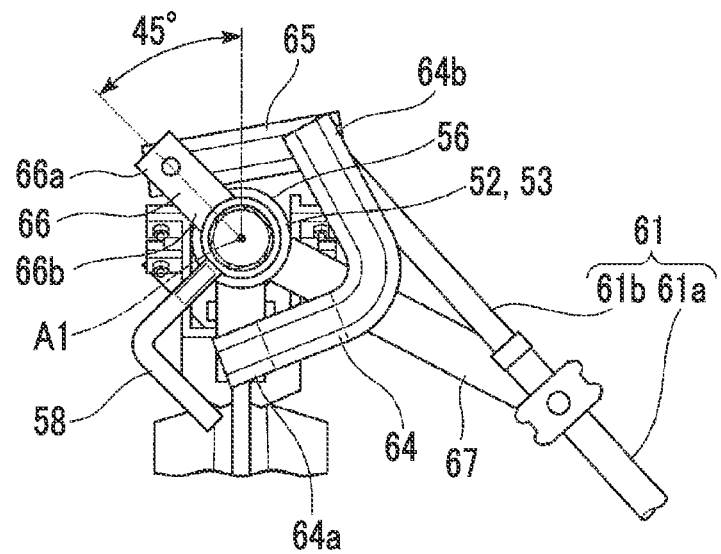
FIG. 14 is a rear view of the first drive device according to the embodiment of the present invention (rotation angle of the first rotational shaft being −45°).

When the rod 61b of the first linear actuator 61 is linearly driven from the state illustrated in FIG. 11 in a direction in which the rod 61b protrudes from the rod cover 61a, the second link piece 64 oscillates about the one end 64a in a counter-clockwise direction in the drawing as illustrated in FIG. 14. The third link piece 65 that is connected to the second link piece 64 is moved in a substantially counter-clockwise direction due to the oscillation of the second link piece 64. When the third link piece 65 is moved in the substantially counter-clockwise direction, the one end 66a of the fourth link piece 66 is displaced in the counter-clockwise direction due to the movement of the third link piece 65. As a result, the first rotational shaft 52 that is fixed to the other end 66b of the fourth link piece 66 rotates in the counter-clockwise direction about the first rotational axis A1.

Figure 15:
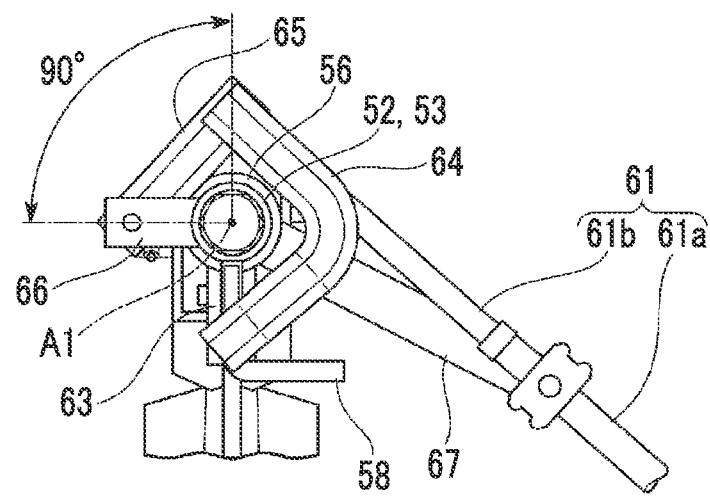
FIG. 15 is a rear view of the first drive device according to the embodiment of the present invention (rotation angle of the first rotational shaft being −90°).
Figure 16:
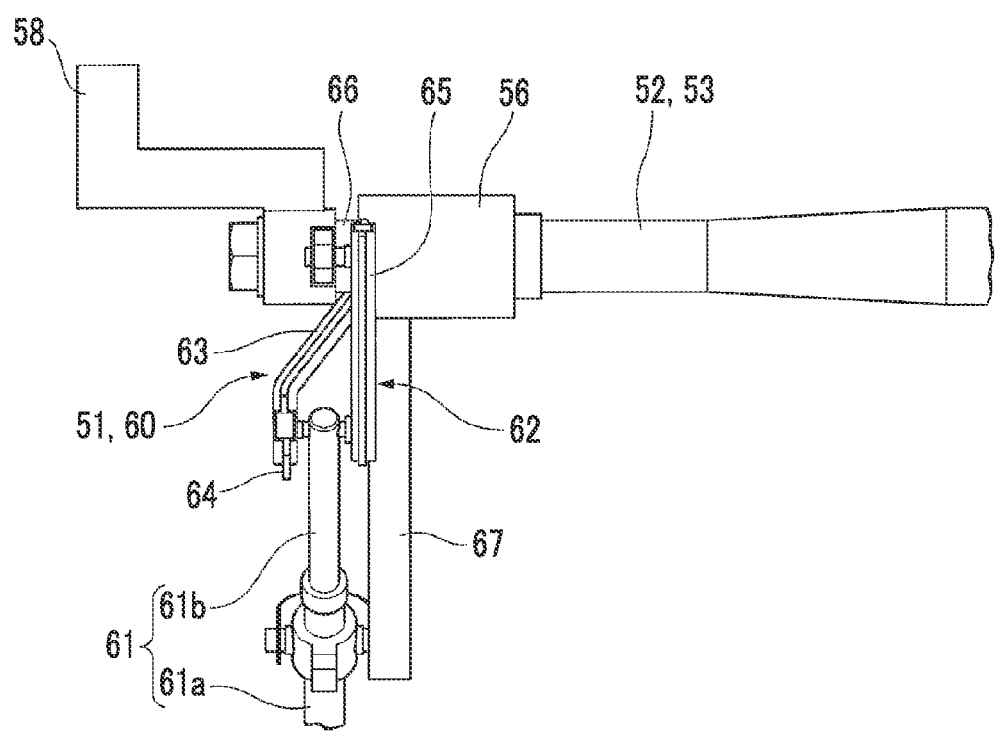
FIG. 16 is a side view of the first drive device according to the embodiment of the present invention.

When the rod 61b of the first linear actuator 61 is further linearly driven from the state illustrated in FIG. 14 in the direction in which the rod 61b protrudes from the rod cover 61a, the first rotational shaft 52 further rotates in the counter-clockwise direction through the same process as described above as illustrated in FIG. 15. In this embodiment, the state illustrated in FIG. 15 is a state where the maximum rotation angle of the first rotational shaft 52 in the counter-clockwise direction is formed. The maximum rotation angle is, for example, −90°.

As described above, the first rotational shaft 52 can rotate within, for example, an angle range of ±90°, that is, an angle range of 180° according to this embodiment.

Assuming that the rotation angle of the first rotational shaft 52 of 0°, which is illustrated in FIG. 11, is a reference state according to this embodiment, the second link piece 64, whose the other end 64*b* is displaced due to the first linear actuator 61, is inclined by only 22.5° from the reference state whereas the fourth link piece 66 is inclined by 45° from the reference state when the rotation angle of the first rotational shaft 52 illustrated in FIG. 12 is 45°. In addition, when the rotation angle of the first rotational shaft 52 illustrated in FIG. 13 is 90°, the second link piece 64, whose the other end 64*b* is displaced due to the first linear actuator 61, is inclined by only 45° from the reference state whereas the fourth link piece 66 is inclined by 90° from the reference state.

Figure 17:
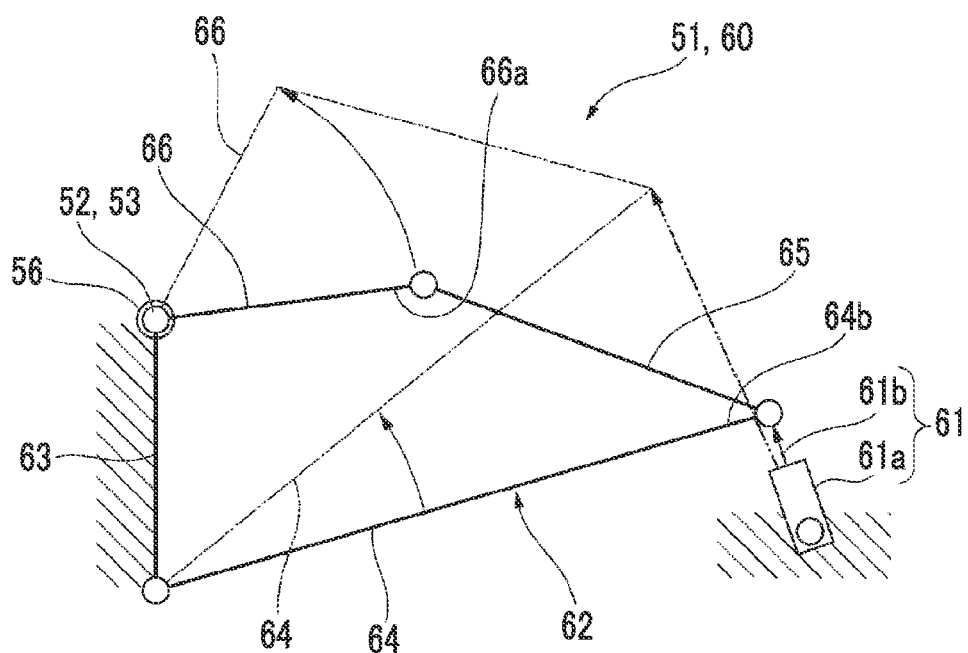
FIG. 17 is an explanatory view illustrating a configuration of a 4-link mechanism according to the embodiment of the present invention.

In other words, in this embodiment, the fourth link piece 66 rotates at an angle that is double the rotation angle of the second link piece 64 when the first linear actuator 61 causes the second link piece 64 to rotate. As illustrated in FIG. 17, this is because the link length of the fourth link piece 66 is shorter than the link length of the second link piece 64 and the rotation angle of the fourth link piece 66 is larger than the rotation angle of the second link piece 64 even in a case where rotation side ends (the other end 64*b* in the second link piece 64 and one end 66*a* in the fourth link piece 66) of the respective link pieces 64 and 66 according to this embodiment have substantially the same amount of displacement.

Accordingly, in this embodiment, the fourth link piece 66 relatively largely rotates even when the second link piece 64 rotates slightly due to the linear driving of the first linear actuator 61, and the rotation angle of the first rotational shaft 52 can be increased. Accordingly, in this embodiment, the rotation angle range of the first rotational shaft 52 can be widened. In addition, in this embodiment, a relationship between an axial force and a torque and a relationship between a stroke and the rotation angle can be predetermined relationships of one-on-one correspondence.

In addition, in this embodiment, the middle portion between the one end 64*a* and the other end 64*b* of the second link piece 64 is arranged in the direction away from the first rotational shaft 52 against the line that connects the one end 64*a* and the other end 64*b* with each other and the second link piece 64 is bent into an L shape as described above. Accordingly, in this embodiment, a contact with the first rotational shaft 52 can be avoided such that the rotation angle range of the second link piece 64 can be widened. As such, in this embodiment, the rotation angle range of the first rotational shaft 52 can be widened in view of this point as well.

As described above, the first rotational shaft 52 according to this embodiment is allowed to rotate by rotating the link piece that is connected to the first rotational shaft 52 with the first linear actuator 61, not by using a rotary motor, and thus a weight increase of a rotary drive source of the first rotational shaft 52 can be suppressed while a large rotational torque is ensured. Further, the rotation angle range of the first rotational shaft 52 can be widened by constituting a special link mechanism as described above although the first rotational shaft 52 is allowed to rotate by rotating the link piece with the first linear actuator 61 according to this embodiment.

Figure 5:
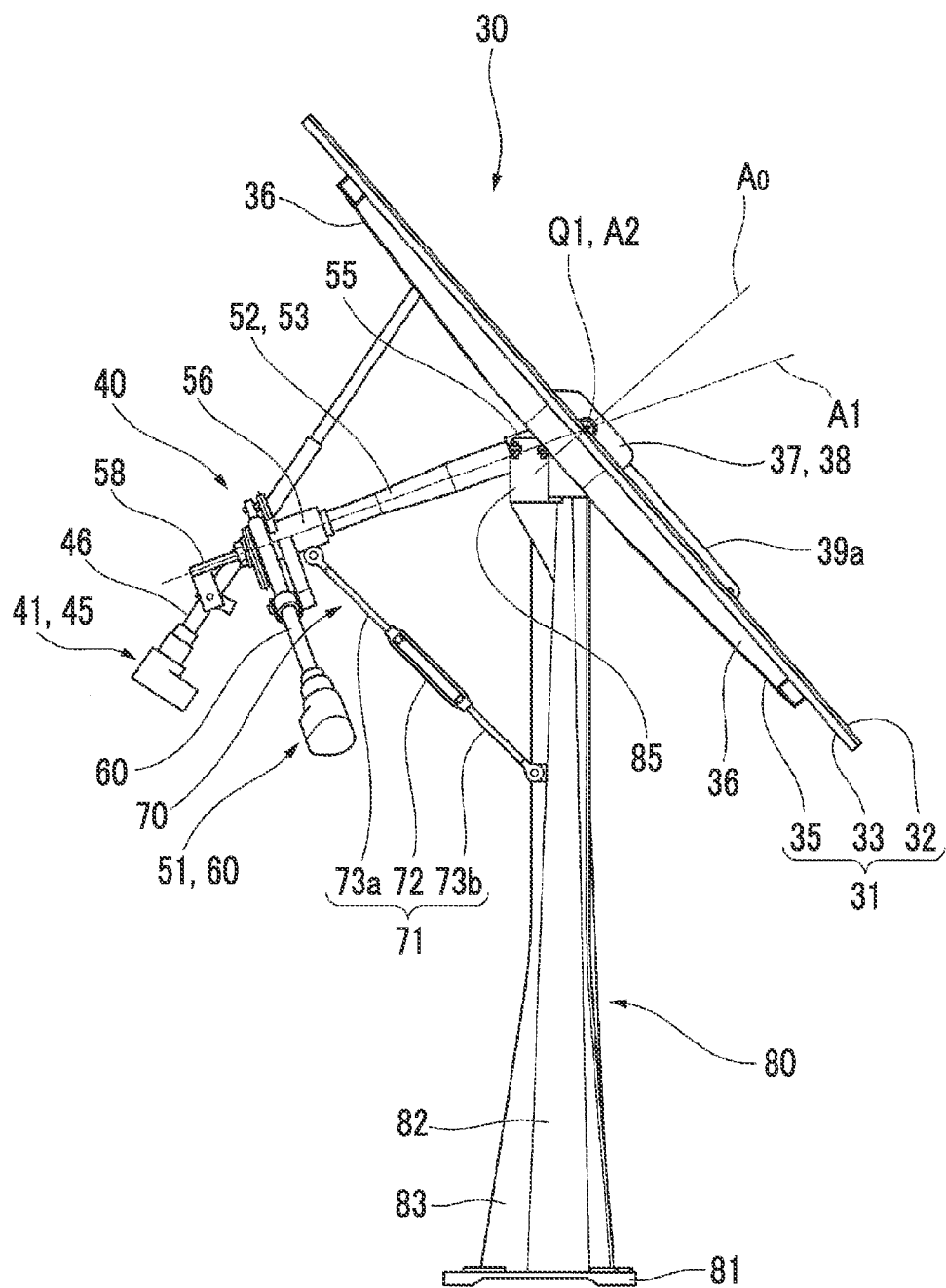
FIG. 5 is a side view of the heliostat according to the embodiment of the present invention.
Figure 6:
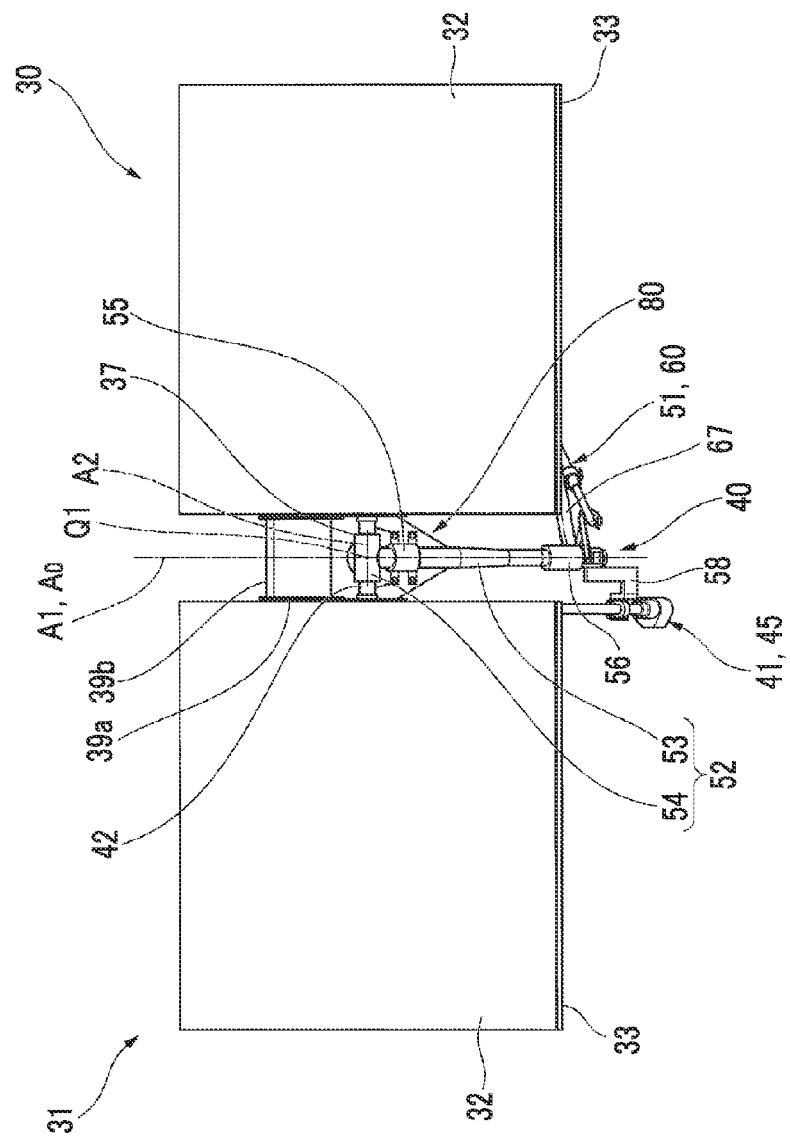
FIG. 6 is a plan view of the heliostat according to the embodiment of the present invention.
Figure 18:
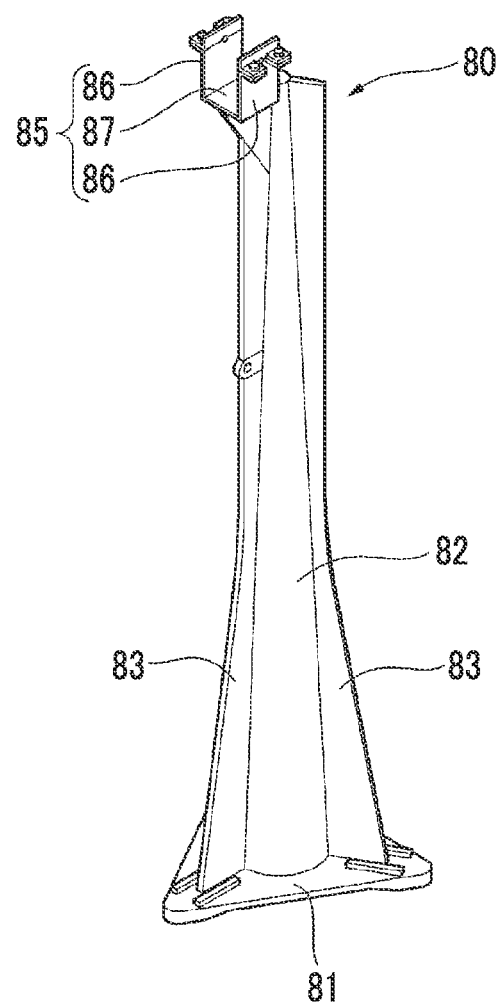
FIG. 18 is a perspective view of a supporting base according to the embodiment of the present invention.
Figure 19:
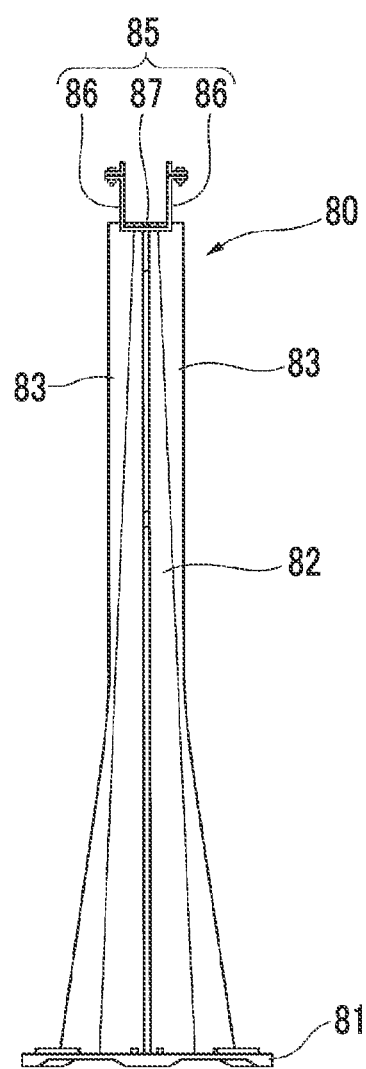
FIG. 19 is a rear view of the supporting base according to the embodiment of the present invention.

As illustrated in FIGS. 5, 18, and 19, the supporting base 80 has a base plate 81 that is placed at installment positions of the heliostats 30, a post 82 that is fixed onto the base plate 81, a plurality of ribs 83 that are arranged along a generatrix of the base, and a shaft support base 85 that supports the first rotational shaft 52.

The post 82 forms a rotating body shape that is formed by rotating an isosceles trapezoid about a symmetrical axis of the isosceles trapezoid, that is, a frusto-conical shape, and a part that corresponds to a bottom of the frustum cone forms a bottom of the post 82, that is, a lower surface. The ribs 83 are arranged from a lower end to an upper end of the post 82 along the generatrix of the base.

The shaft support base 85 has a pair of arm plates 86 that face each other with a gap, and a connection plate 87 that connects ends of the pair of arm plates 86 with each other. The connection plate 87 of the shaft support base 85 is fixed to the post 82. In addition, the front bearing 55, which supports the first rotational shaft 52 to be rotatable about the first rotational axis A1, is arranged between the pair of arm plates 86 as illustrated in FIG. 9. An elevation changing shaft 88, which is perpendicular to the first rotational axis A1 and extends in a horizontal direction, is disposed in the front bearing 55. The elevation changing shaft 88 is supported by the arm plates 86 to be capable of passing through the arm plates 86 of the shaft support base 85 and rotating about a center of the elevation changing shaft 88. The first rotational shaft 52 rotates about the elevation changing shaft 88, and thus the angle with respect to the horizontal plane can be changed.

One end of a turnbuckle 71 (FIG. 5) is pin-connected to the rear bearing 56, which supports the first rotational shaft 52 to be rotatable about the first rotational axis A1. The other end of the turnbuckle 71 is pin-connected to a middle portion of the post 82 or the rib 83 of the supporting base 80 in a height direction. The turnbuckle 71 has a body frame 72 that has female screws formed in both ends, and screw rods 73*a* and 73*b* that are screwed into the respective ends of the body frame 72. A mutual gap between both the screw rods 73*a* and 73*b* can be changed by rotating the body frame 72.

The turnbuckle 71 serves to change the angle of the first rotational shaft 52 with respect to the horizontal plane by rotating the body frame 72 and changing the mutual gap between both the screw rods 73*a* and 73*b* and to maintain the angle at a desired angle. Accordingly, in this embodiment, the turnbuckle 71, the elevation changing shaft 88 that is disposed in the rear bearing 56, and the shaft support base 85 that supports the elevation changing shaft 88 constitute the elevation changing structure 70. In addition, the turnbuckle 71 also constitutes a rear bearing support member that supports the rear bearing 56. Although the turnbuckle 71 is used in the elevation changing structure 70 that changes the angle of the first rotational shaft 52 with respect to the horizontal plane herein, what has a linear actuator, a rack and pinion mechanism that converts a rotational motion to a linear motion, and a rotary motor that rotates a pinion of this mechanism or the like may be used as other examples not limited to the turnbuckle 71.

In this embodiment, the point of intersection between the first rotational axis A1 and the second rotational axis A2 and the principal point Q1 of the mirror structure 31 match with each other as already described above with reference to FIGS. 3 and 10. Accordingly, in this embodiment, the principal point Q1 of the mirror structure 31 is not moved whether the mirror structure 31 rotates about the first rotational axis A1 or the mirror structure 31 rotates about the second rotational axis A2. In other words, in this embodiment, the principal point Q1 of the mirror structure 31 is a fixed point.

In this embodiment, the principal point Q1 of the mirror structure 31 is not moved whether the mirror structure 31 rotates about the first rotational axis A1 or the mirror structure 31 rotates about the second rotational axis A2 as described above. Accordingly, relative positions of the principal point Q1 of the mirror structure 31 and the heat receiving portion 11 (heat collection position) of the heat receiver 10 do not change.

Accordingly, in this embodiment, it is possible to accurately continue irradiating the heat receiving portion of the heat receiver 10 with the sunlight that is reflected by the mirror 32 of the mirror structure 31 when the optical axis Ao of the mirror structure 31 is directed in a direction in which an angle formed in this case by an imaginary line connecting the Sun to the principal point Q1 of the mirror structure 31 and an imaginary line connecting the principal point Q1 of the mirror structure 31 to a concentrating position is halved.

In addition, a center of gravity Q2 of the mirror structure 31 described above is located at a position that is slightly shifted from the principal point Q1 of the mirror structure 31 to a rear side, which is the support beam member 36 side, based on the mirror 32 on the optical axis Ao of the mirror structure 31. Still, the center of gravity Q2 is located in an intersecting portion between the first rotational shaft 52 and the second rotational shaft 42. As such, in this embodiment, the position of the center of gravity Q2 is rarely moved whether the mirror structure 31 rotates about the first rotational axis A1 or the mirror structure 31 rotates about the second rotational axis A2. Furthermore, a moment to rotate the mirror structure 31 itself about the first rotational axis A1 and the second rotational axis A2 with the weight of the mirror structure 31 itself is rarely generated.

Accordingly, in this embodiment, the driving force to rotate the mirror structure 31 can be decreased, and the mirror structure 31 can be stably supported even when the rigidity of the first rotational shaft 52 and the second rotational shaft 42, the rigidity of a support structure that has the bearing which supports the rotational shafts 52 and 42 to be rotatable, and the like are somewhat small.

As described above, the rigidity of the first rotational shaft 52 and the second rotational shaft 42 and the like can be decreased according to this embodiment, and thus the first rotational shaft 52 and the second rotational shaft 42 can be compact in size and light in weight. Furthermore, the first rotational shaft main body 53 and the second rotational shaft 42 are formed as hollow pipes in this embodiment, and thus the weight reduction can be achieved while high rigidity is ensured.

Furthermore, the center of gravity Q2 of the mirror structure 31 according to this embodiment is located on the post 82, which is a main component of the supporting base 80. More accurately, the center of gravity Q2 of the mirror structure 31 according to this embodiment is located in a vertically extended line of the lower surface and an upper surface of the post 82 that has the frusto-conical shape. As such, in this embodiment, an overturning moment by the weight of the mirror structure 31 is rarely applied to the base plate 81 side of the post whether the mirror structure 31 rotates about the rotational axes A1 and A2.

Accordingly, the supporting base 80 according to this embodiment can be compact in size and light in weight. The size reduction of the supporting base 80 herein is not to lower the height of the supporting base 80 but to reduce the diameter of the post 82 that constitutes the supporting base 80 and to reduce the thickness and the width of the rib 83 or to omit the rib 83.

Herein, a bending moment that is applied to a lower portion of the supporting base 80 is greater than a bending moment that is applied to an upper portion of the supporting base 80. As such, in this embodiment, a cross-sectional secondary moment on the lower portion side can be increased by adopting the post 82 with the frusto-conical shape so as to be capable of enduring the relatively greater bending moment that is applied to the lower portion side, that is, the overturning moment that is applied to the supporting base 80. Furthermore, the cross-sectional area of an upper portion of the post 82 can be reduced according to this embodiment, and thus the movable range of the mirror structure 31 and the movable range of the driving mechanism 40 can be widened.

In addition, in this embodiment, the first linear actuator 61 and the 4-link mechanism 62 as the drive sources that rotate the first rotational shaft 52 are far apart from the point of intersection Q1 between the first rotational axis A1 and the second rotational axis A2. Specifically, the distance from the point of intersection Q1 to the first linear actuator 61 and the 4-link mechanism 62 is much longer than the distance from the point of intersection Q1 to the front bearing 55, which supports the first rotational shaft 52 to be rotatable. Furthermore, the second linear actuator 46 as the drive source that rotates the second rotational shaft 42 is also far apart from the point of intersection Q1 between the first rotational axis A1 and the second rotational axis A2. Specifically, the distance from the point of intersection Q1 to the second linear actuator 46 is much longer than the distance from the point of intersection Q1 to the bearing 43, which supports the second rotational shaft 42 to be rotatable. In other words, in this embodiment, the second linear actuator 46 as well as the first linear actuator 61 and the 4-link mechanism 62 are far apart from the point of intersection Q1 between the first rotational shaft 52 and the second rotational shaft 42.

As such, in this embodiment, the distance between the two mirrors 32, where the point of intersection Q1 is positioned in the middle, can be shortened, and a moment that is applied to the mirrors 32 when the mirrors 32 are subject to a wind load can be reduced.

Next, a procedure for manufacturing the mirror structure 31 described above will be described with reference to FIGS. 20 and 21.

Figure 20:
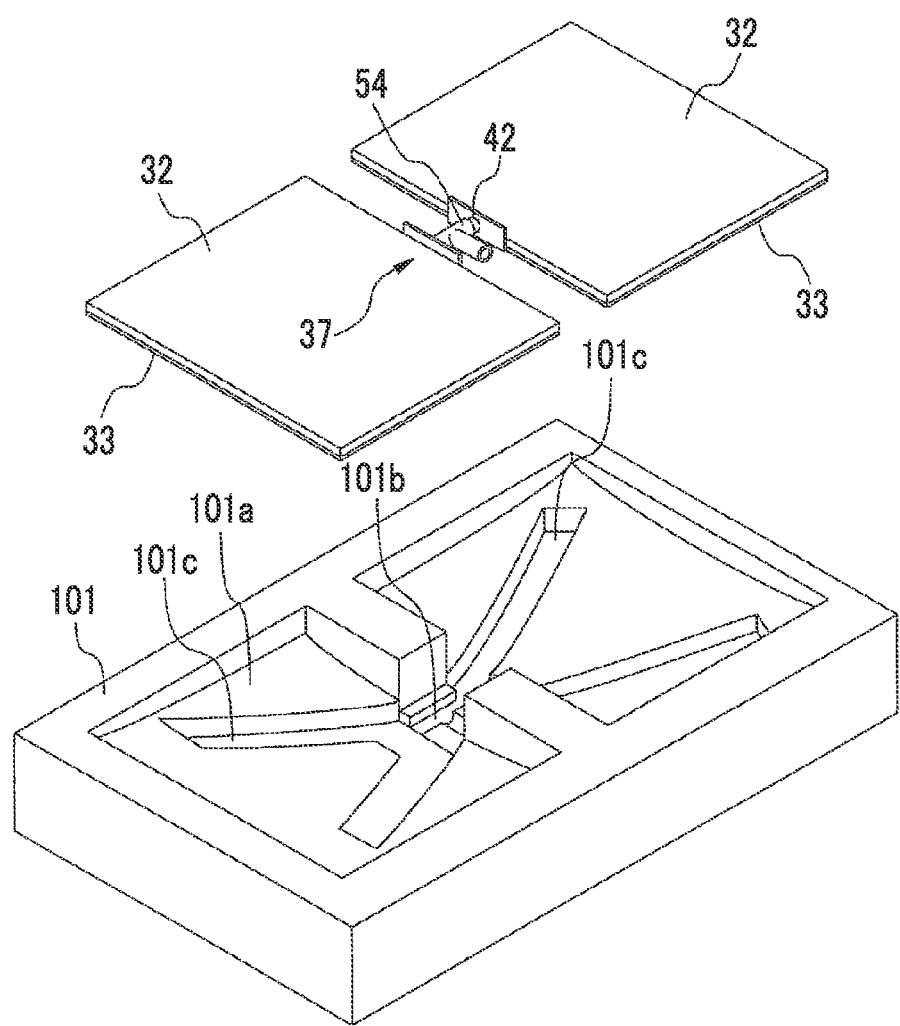
FIG. 20 is an explanatory view illustrating a relationship between a lower mold and a pre-correction mirror structure in a manufacturing process according to the embodiment of the present invention.
Figure 21:
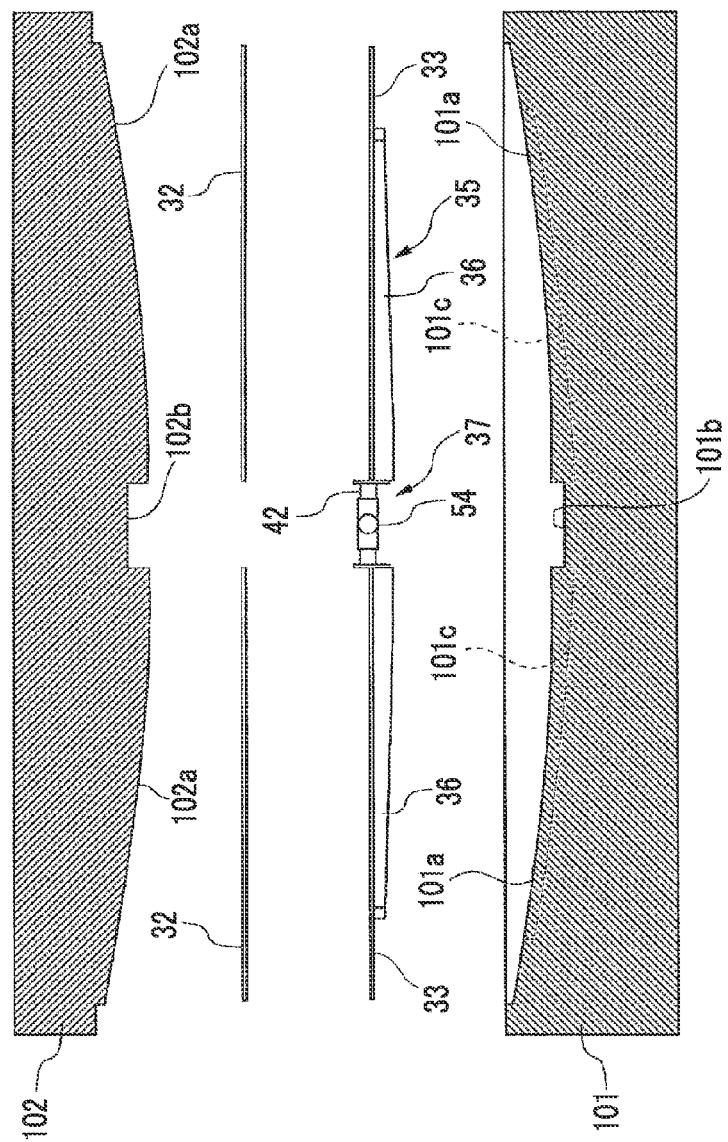
FIG. 21 is an explanatory view of a correction process of the manufacturing process according to the embodiment of the present invention.

In a preparation step, the two mirrors 32, the two rear plates 33, and the supporting frame 35 described above are prepared. At this point of time, both the reflective surfaces of the two mirrors 32 are flat. In addition, the rigidity of the rear plate 33 itself is extremely low and the rear plate 33 is deformed due to its own weight although the concave-convex shape is formed in the rear plate 33. Furthermore, as illustrated in FIGS. 20 and 21, an upper mold 102 and a lower mold 101 are prepared so as to deform the mirror 32, the rear plate 33, and the supporting frame 35 and maintain the deformed state.

A mirror facing surface 102a that faces the two mirrors 32, and a rotational shaft facing surface 102b that faces the second rotational shaft 42 and the T pipe 54 of the supporting frame 35 are formed in the upper mold 102. The mirror facing surface 102a forms a convex shape that corresponds to the paraboloid of revolution, which is a desired shape of the reflective surfaces of the two mirrors 32. In addition, the rotational shaft facing surface 102b forms a shape that corresponds to the shape of the second rotational shaft 42 and the T pipe 54.

A rear plate facing surface 101a that faces the two rear plates 33, a rotational shaft facing surface 101b that faces of the second rotational shaft 42 and the T pipe 54 of the supporting frame 35, and a support beam facing surface 101c that faces the support beam member 36 of the supporting frame 35 are formed in the lower mold 101. The rear plate facing surface 101a forms a concave shape that corresponds to the paraboloid of revolution, which is a desired shape of the reflective surfaces of the two mirrors 32. In addition, the rotational shaft facing surface 101b forms a shape that corresponds to the shapes of the second rotational shaft 42 and the T pipe 54. In addition, the support beam facing surface 101c forms a concave shape that corresponds to the paraboloid of revolution, which is a desired shape of the reflective surfaces of the two mirrors 32 as is the case with the rear plate facing surface 101a. Still, the support beam facing surface 101c is a surface that is in contact with the support beam member 36, and thus is formed at a position recessed from the rear plate facing surface 101a which is in contact with the rear plate 33.

Next, the two rear plates 33 are bonded to the supporting frame 35. In this case, the support beam member 36 is bonded to the back surface of the rear plate 33 by welding or adhesion.

Next, the supporting frame 35, to which the two rear plates 33 are bonded, is set in the lower mold 101. In this case, the second rotational shaft 42 and the T pipe of the supporting frame 35 are allowed to face the rotational shaft facing surface 101b of the lower mold 101, and the support beam member 36 of the supporting frame 35 is allowed to face the support beam facing surface 101c. Then, the adhesive is applied to the top portions of the multiple convex portions of the two rear plates 33. In this case, the adhesive may be quickly applied by a dispenser, a robot arm, or the like, such that the previously applied adhesive is not dried or cured during the process for applying the adhesive to the vertices of the multiple convex portions.

Next, the flat mirror 32 is put on each of the two rear plates 33, which are bonded to the supporting frame 35 that is set in the lower mold 101, and then the upper mold 102 is allowed to face the lower mold 101 and the upper mold 102 is pressed to the lower mold 101. As a result, the mirrors 32, the rear plates 33, and the support beam member 36 are elastically deformed such that the shapes are corrected to the shape following the shapes of the upper mold 102 and the lower mold 101. In other words, the reflective surfaces of the two mirrors 32 have a shape that forms the one paraboloid of revolution, and the rear plates 33 and the support beam member 36 have shapes that correspond to the shape of the mirrors 32. Meanwhile, the second rotational shaft 42 and the T pipe 54 of the supporting frame 35 are not deformed, and the shapes prior to the pressing of the upper mold 102 to the lower mold 101 are maintained.

Then, the adhesive is left to be cured until the adhesion of the mirrors 32 and the rear plates 33 is completed while the correction state described above is maintained, that is, the elastic deformation state of the mirrors 32, the rear plates 33, and the support beam member 36 are maintained. Herein, the elastic adhesive is used as the adhesive that adheres at least a part of the mirror 32 and the rear plate 33, and thus the elasticity thereof is not lost even when the adhesive is cured.

When the curing step is completed, the upper mold 102 is removed from the lower mold 101, and the mirror structure 31, in which the two mirrors 32, the two rear plates 33, and the supporting frame 35 are integrated, is taken out from the lower mold 101. The mirror structure 31 is completed as described above.

The completed mirror structure 31 forms a single rigid body, in which the mirrors 32, the rear plates 33, and the supporting frame 35 are integrated, with the elastic deformation state of the mirrors 32, the rear plates 33, and the support beam member 36 maintained by the curing of the adhesive. In other words, in this embodiment, the rigidity of the mirror structure 31 is first ensured in a step where the mirrors 32, the rear plates 33, and the supporting frame 35 are integrated.

Accordingly, in this embodiment, high rigidity is not required for each of the mirrors 32, the rear plates 33, and the supporting frame 35, and the mirror structure can be light in weight. Furthermore, in this embodiment, the plurality of support beam members 36 extend in the radiation direction, that is, a direction in which the curvature of the mirror 32 changes, with respect to the optical axis Ao of the mirror structure 31 as described above, and the mirror 32 and the rear plate 33 are supported very efficiently. The mirror structure 31 can be light in weight in view of this point as well.

Accordingly, in this embodiment, the transport and the on-site assembly of the mirror structure 31 can be facilitated, and the driving force can be reduced when the mirror structure 31 is directed in a desired direction with the driving mechanism 40.

In addition, according to this embodiment, labor for individually processing the mirrors can be omitted unlike in a case where a plurality of mirrors that already form a desired three-dimensional curved surface are mounted on a supporting frame or the like. In addition, the adjustment of the orientation and the position of each of the mirrors 32 with respect to the supporting frame 35 is extremely facilitated such that the manufacturing steps can be simplified.

Next, a method for setting each of the rotational axes A1 and A2 of the heliostats 30 described above will be described.

An equatorial telescope is used in an astronomical telescope so as to facilitate the tracking of stars, the Sun, and the like. The equatorial telescope has a right ascension axis that is set to be parallel with the Earth's axis, and a declination axis that is perpendicular to the right ascension axis. With the equatorial telescope, a diurnal motion of a desired celestial body can be responded by just rotating the astronomical telescope about the right ascension axis once an optical axis of the astronomical telescope is directed to the celestial body by rotating the astronomical telescope about the right ascension axis and the declination axis.

As such, even in the case of the heliostat, the Sun that is in the diurnal motion can be tracked by setting one rotational shaft to be parallel with the Earth's axis and rotating the mirror structure about the rotational shaft if the driving mechanism of the mirror structure has two rotational shafts orthogonal to each other. However, the heliostat is required to reflect the light from the Sun in the diurnal motion and irradiate the fixed heat receiver 10 with the light. As such, even if one of the two rotational shafts orthogonal to each other is set to be parallel with the Earth's axis, the heliostat cannot irradiate the fixed heat receiver 10 with the light from the Sun in the diurnal motion, as is the case with the astronomical telescope, unless the mirror structure is allowed to rotate about the two rotational shafts.

Figure 22:
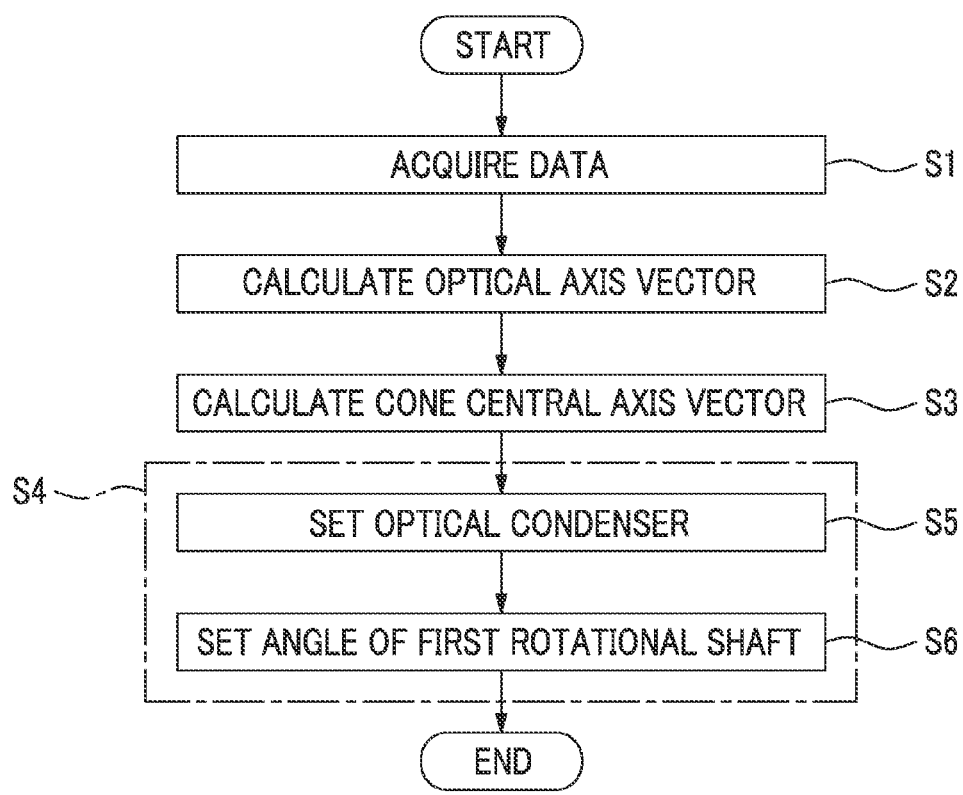
FIG. 22 is a flowchart illustrating a procedure for setting the rotational axis according to the embodiment of the present invention.

Hereinafter, a method for setting the rotational axis, with which the fixed heat receiver 10 can be irradiated with the light from the Sun in the diurnal motion by allowing the mirror structure to rotate basically about the one rotational shaft, will be described with reference to the flowchart illustrated in FIG. 22.

Figure 23:
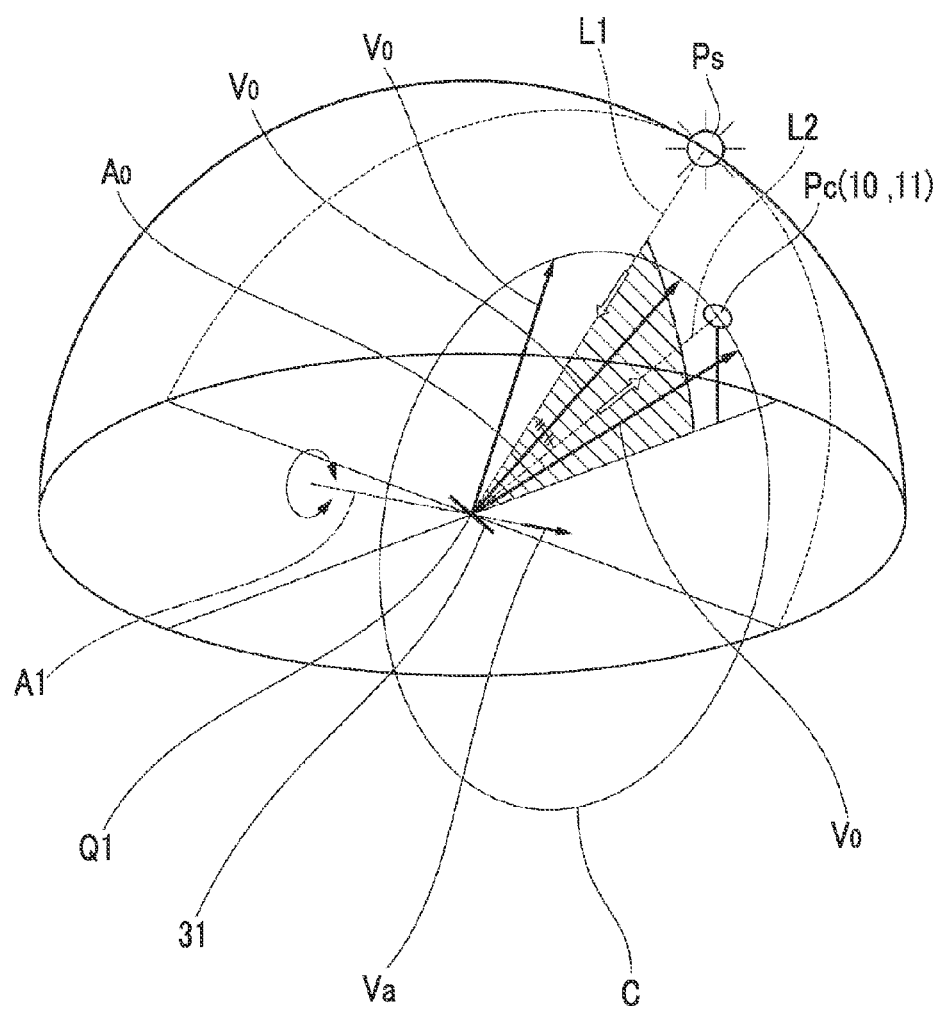
FIG. 23 is an explanatory view (I) illustrating a method for setting a first rotational axis according to the embodiment of the present invention.
Figure 24:
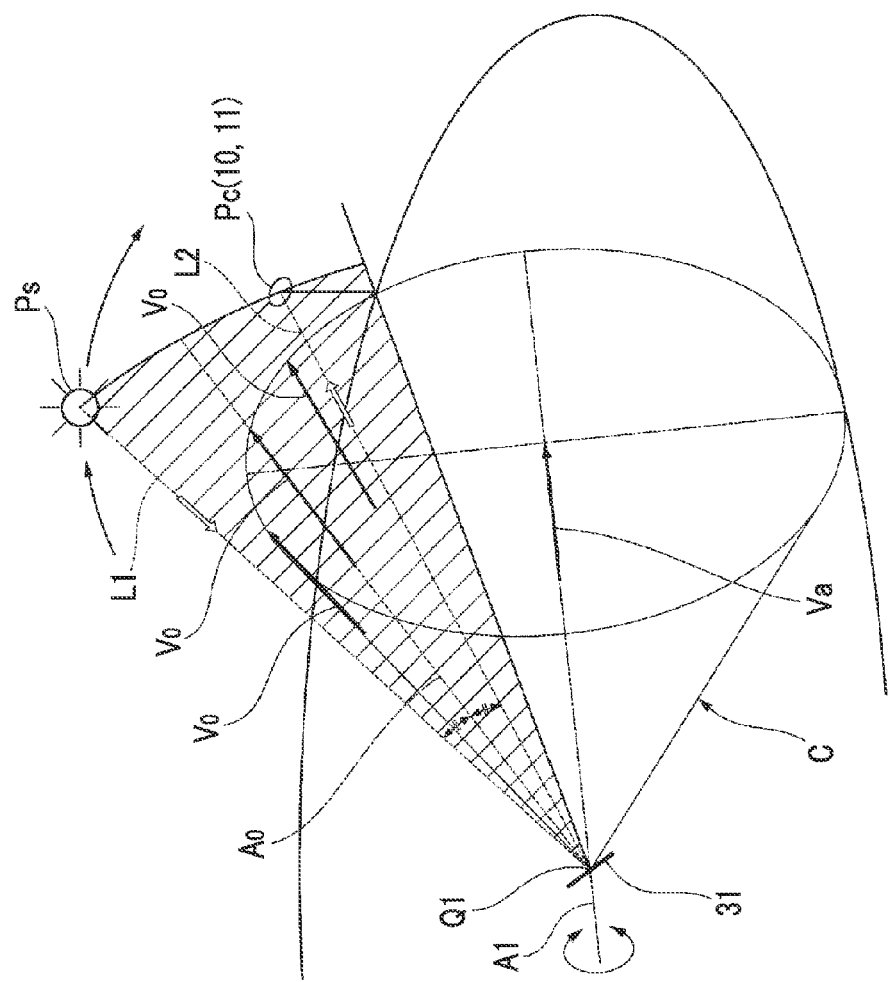
FIG. 24 is an explanatory view (II) illustrating the method for setting the first rotational axis according to the embodiment of the present invention.

Firstly, data on an Earth position where the mirror structure 31 is installed, data on an Earth position of the heat receiving portion 11 of the heat receiver 10, which is a sunlight concentrating position Pc, and Sun position data based on the position of the mirror structure 31 at each of a plurality of hours of predetermined dates of a year are acquired as illustrated in FIGS. 23 and 24 (S1).

The position data on the mirror structure 31 and the concentrating position data are data showing Earth coordinate data, that is, data showing a latitude and a longitude. The position data on the mirror structure 31, more accurately, is the position data on the principal point Q1, which is the fixed point of the mirror structure 31. However, such an accurate data is not required herein, and the data on the position where the heliostat 30 is installed suffices.

The Sun position data based on the position of the mirror structure 31 is data showing the azimuth of the Sun Ps and the elevation of the Sun Ps from the position of the mirror structure 31. In addition, examples of the predetermined dates of a year include the vernal equinox and the autumnal equinox. In addition, the number of the sun position data is the number with which the daily trajectory of the Sun Ps on the predetermined date can be specified, specifically, at least three.

Next, an optical axis vector Vo, which shows a direction of the optical axis Ao of the mirror structure that directs the light from the Sun Ps to the concentrating position Pc at the predetermined hour, is obtained for each of the plurality of hours of the predetermined date (S2). The direction of the optical axis Ao of the mirror structure 31 that directs the light from the Sun Ps to the concentrating position Pc at a certain hour is a direction in which an angle formed by an imaginary line L1 connecting the Sun Ps with the principal point Q1 of the mirror structure 31 and an imaginary line L2 connecting the principal point Q1 of the mirror structure 31 with the concentrating position Pc is halved. In this embodiment, the optical axis vector Vo is a unit vector directed in this direction.

The trajectory of a direction line shown by the optical axis vector Vo following the diurnal motion of the Sun Ps draws a side circumferential surface of a certain cone. In other words, the trajectory of the optical axis Ao of the mirror structure 31 that directs the light from the Sun Ps in the diurnal motion to the concentrating position Pc draws a side circumferential surface of a cone. Subsequently, a cone C that has the generatrix which the direction line shown by the optical axis vector Vo at each of the plurality of hours is along is determined, and a cone central axis vector Va that shows a direction of a central axis of the cone C is obtained (S3). The cone central axis vector Va is a unit vector as well.

Then, the first rotational axis A1 of the heliostat 30 is directed in the direction shown by the cone central axis vector Va (S4). When the direction of the first rotational axis A1 is allowed to match with the direction of the cone central axis vector Va in this manner, the trajectory of the direction line shown by the actual optical axis vector Vo following the diurnal motion of the Sun Ps can form the side circumferential surface of the cone C, which is determined in Step 3, by just rotating the mirror structure 31 basically about the first rotational axis A1 once the mirror structure 31 is allowed to rotate about the second rotational axis A2 and the concentrating position Pc is irradiated with the sunlight reflected by the mirror structure 31. In other words, in this embodiment, the fixed concentrating position Pc can be irradiated with the sunlight from the Sun Ps in the diurnal motion by allowing the direction of the first rotational axis A1 to match with the direction of the cone central axis vector Va and just rotating the mirror structure 31 basically about the first rotational axis A1.

Figure 25:
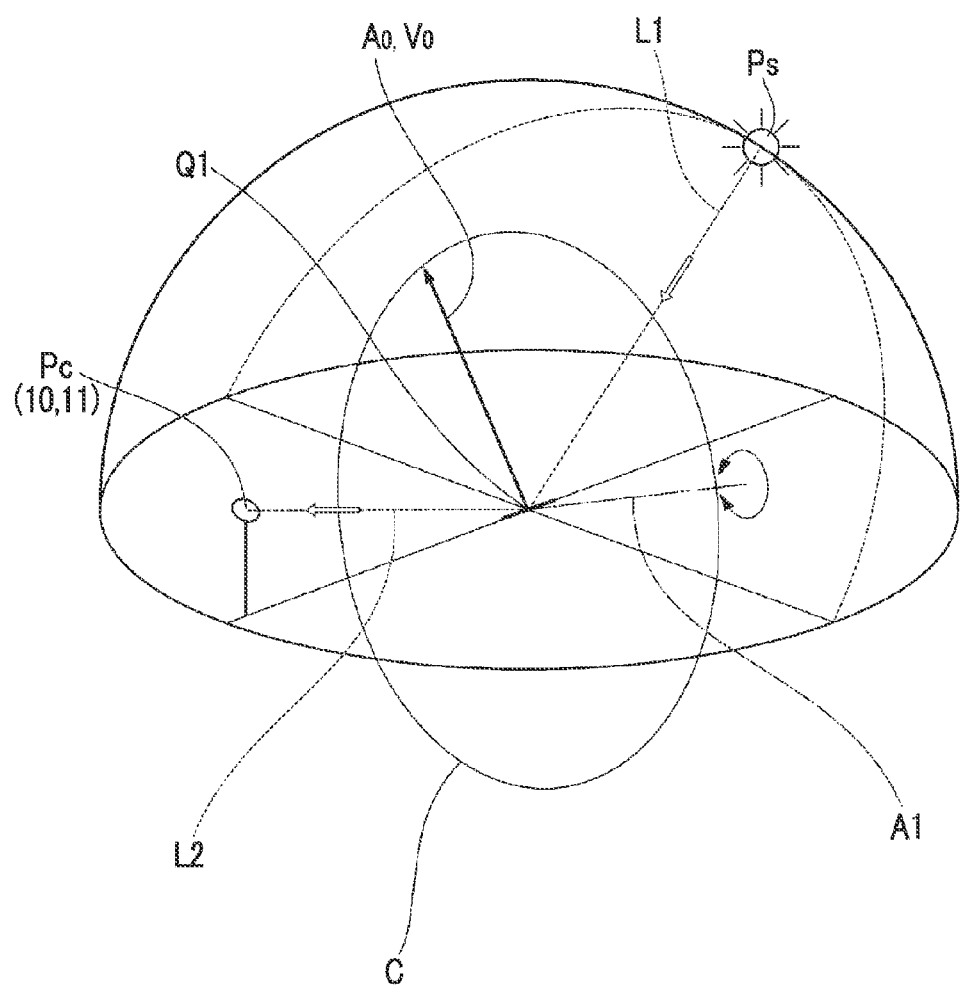
FIG. 25 is an explanatory view (III) illustrating the method for setting the first rotational axis according to the embodiment of the present invention.
Figure 26:
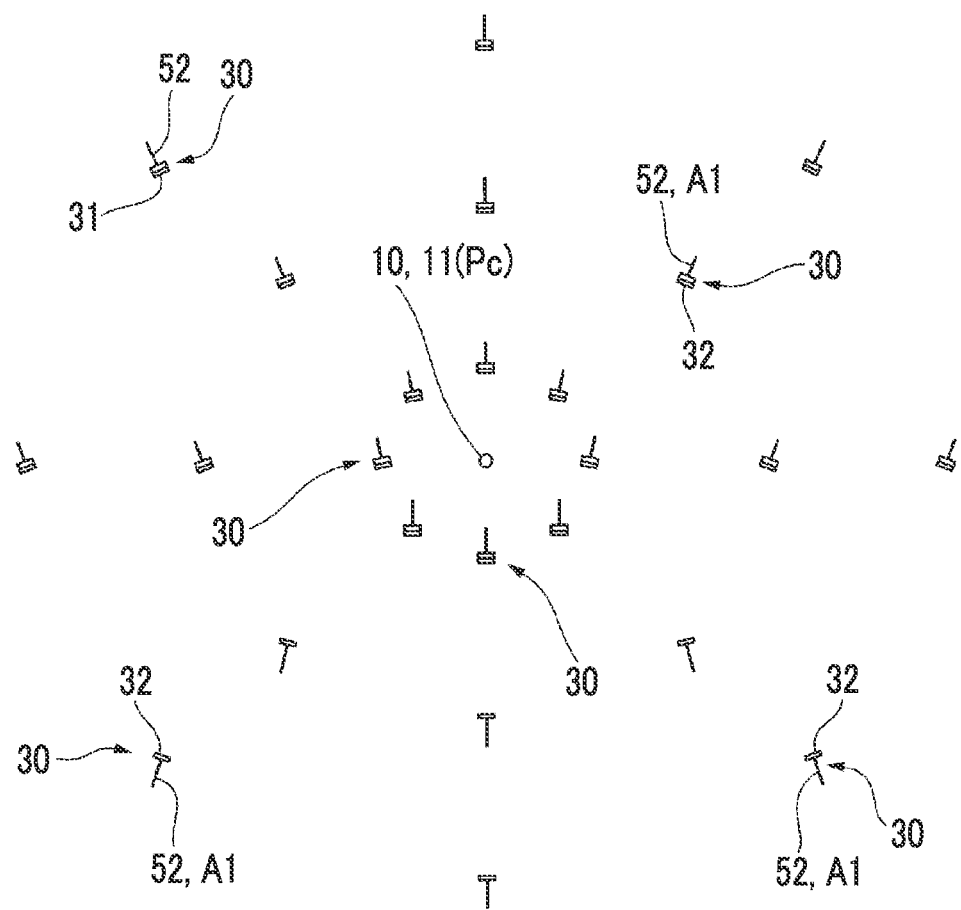
FIG. 26 is an explanatory view illustrating an orientation of the first rotational axis of each of a plurality of heliostats according to the embodiment of the present invention.

Herein, the plurality of heliostats 30 are installed in an installation area of the heat collection apparatus as described above. It is a matter of course that the plurality of heliostats 30 have different relative positions with respect to the heat receiver 10. Accordingly, the angles of the first rotational axes A1 of the plurality of heliostats 30 with respect to the horizontal plane are different as illustrated in FIGS. 23 and 25. Furthermore, the orientations of the first rotational axes A1 of the heliostats 30 are different as illustrated in FIG. 26. In the heliostat 30 that is drawn in a T shape in FIG. 24, a part of the T shape that corresponds to the horizontal line shows the mirror structure 31, and a part of the T shape that corresponds to the vertical line shows the first rotational shaft 52.

Accordingly, in Step 4, the mirror structure 31 is positioned first at the position shown by the position data of the mirror structure 31 which is acquired in Step 1, and the heliostat 30 is installed such that the orientation of the first rotational axis A1 is the orientation shown by the cone central axis vector Va (S5).

Then, the first rotational axis A1 is set such that the angle of the first rotational axis A1 with respect to the horizontal plane is the angle of the cone central axis vector Va with respect to the horizontal plane (S6). In this case, the turnbuckle 71 of the elevation changing structure 70 is operated such that the angle of the first rotational shaft 52 with respect to the horizontal plane is set.

In this embodiment, the rotation angle range of the second rotational shaft 42 is 90° with the optical axis Ao, which is perpendicular to the second rotational axis A2, being from 90° to 180° based on the first rotational shaft as described above. Accordingly, the orientation of the optical axis Ao can be changed within a range of 70° to 160° in the counter-clockwise direction with respect to a horizontal plane H by rotating the second rotational shaft 42 in a case, for example, where one side A1a of the first rotational axis A1 is not higher than the other side A1b as illustrated in FIG. 27A and in a face-down state where the angle of the first rotational axis A1 with respect to the horizontal plane H in the counter-clockwise direction is set to be 340° (−20°).

In a case where the angle of the optical axis Ao in the counter-clockwise direction with respect to the horizontal plane H, at which the concentrating position Pc can be irradiated with the sunlight, is within a range of 0° to 70°, the following processing is performed during the step (S5) for installing the heliostat and the step (S6) for setting the angle of the first rotational shaft.

In the step (S5) for installing the heliostat, the heliostat 30 is installed as illustrated in FIG. 27B such that the orientation of the one side A1a with respect to the other side A1b of the first rotational axis A1 is a reverse orientation to the orientation at a time of the setting in the face-down state described above.

In the step (S6) for setting the angle of the first rotational shaft, the one side A1a of the first rotational axis A1 is higher than the other side A1b, and the angle of the first rotational axis A1 in the counter-clockwise direction with respect to the horizontal plane H is set to be 340° (−20°) in a face-up state. In other words, the one side A1a of the first rotational axis A1 is higher than the other side A1b, and the angle of the other side A1b of the first rotational axis A1 with respect to the horizontal plane H is set to be the angle of the one side A1a of the first rotational axis A1 in the face-down state with respect to the horizontal plane H.

When the heliostat 30 is installed and the direction of the first rotational axis A1 is set as described above, the orientation of the optical axis Ao can be changed within a range Rr of −20° to 70° in the counter-clockwise direction with respect to the horizontal plane H by rotating the second rotational shaft 42.

The mutual gap between the screw rods 73a and 73b can be changed, by allowing the body frame 72 of the turnbuckle 71 to rotate, to respond to a case where the angle of the first rotational shaft 52 with respect to the horizontal plane is changed as described above. In addition, a case where a range of change in the angle of the first rotational shaft 52 with respect to the horizontal plane is changed can be responded by using the difference between the lengths of both the screw rods 73a and 73b themselves of the turnbuckle 71.

As described above, according to the driving mechanism 40 of this embodiment, the rotation angle range of the second rotational shaft 42 is within a predetermined range based on the first rotational axis A1. However, when the orientation of the one side A1a with respect to the other side A1b of the first rotational axis A1 is the reverse direction and the face-down state or the face-up state of the first rotational axis A1 is used properly, the rotation angle range of the second rotational axis A2 that is to scheduled to be used can be included within the rotation angle range of the second rotational axis A2 after the installation of the heliostat 30.

The installation of the heliostat 30 and the setting of the first rotational axis A1 is completed in the above-described manner.

In order to irradiate the concentrating position Pc with the sunlight by using the mirror 32 of the heliostat after the completion of the installation of the heliostat 30 and the setting of the first rotational axis A1, the second rotational shaft 42 is allowed to rotate such that the concentrating position Pc is irradiated with the sunlight which is reflected by the mirror structure 31, that is, the mirror structure 31 is allowed to rotate about the second rotational axis A2. Once the concentrating position Pc is irradiated with the sunlight that is reflected by the mirror structure 31 in this manner, the fixed concentrating position Pc can be irradiated with the light of the Sun in the diurnal motion by just rotating the mirror structure 31 basically about the first rotational axis A1 as described above.

Accordingly, in this embodiment, a control system of the driving mechanism 40 can be simplified and energy consumption can be suppressed.

The elevation of the Sun changes, even at the same hours of a date, as seasons change. When the elevation of the Sun changes due to the seasonal changes, the optical axis vector Vo at the same hours of a date also changes. As a result, the cone C, which is determined during the setting of the first rotational axis A1, changes due to the seasonal changes. However, the change of the cone C resulting from the seasonal changes is not a change in the direction of the central axis of the cone C but a change in the diameter of the bottom surface of the cone C. As such, in this embodiment, the change in the rotation angle of the second rotational axis A2, that is, the change in the rotation angle of the mirrors 32 about the second rotational shaft 42 corresponds to the change in the elevation of the Sun resulting from the seasonal changes.

Figure 28:
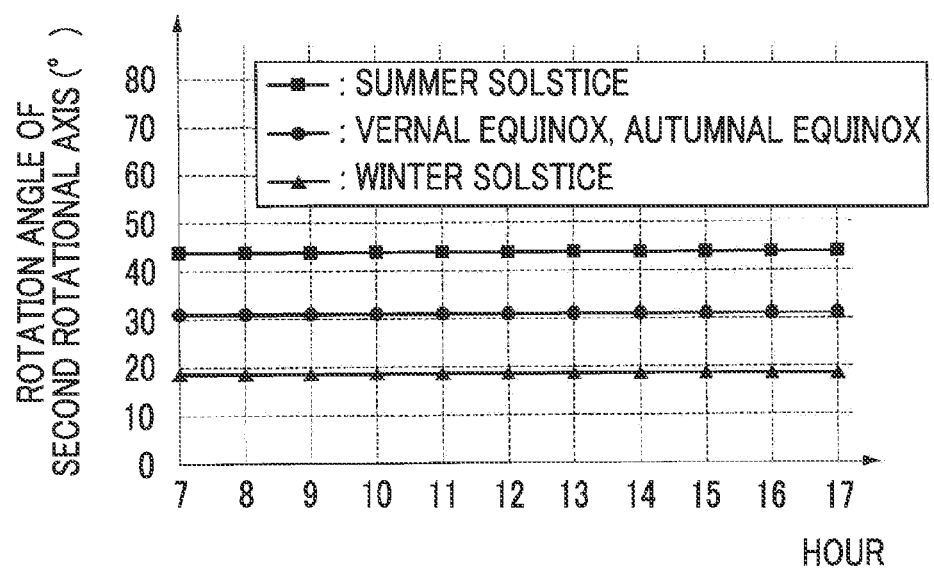
FIG. 28 is an explanatory view illustrating a rotation angle change of the second rotational shaft according to the embodiment of the present invention resulting from a seasonal variation.

Specifically, the rotation angle of the second rotational axis A2 at the winter solstice and the rotation angle of the second rotational axis A2 at the summer solstice are changed with respect to the rotation angles of the second rotational axis A2 at the vernal equinox and the autumnal equinox as illustrated in FIG. 28. The change of the rotation angle of the second rotational axis A2 resulting from the seasonal changes may be performed on a daily basis or once every several days. This change may be performed manually. Alternatively, the second rotational shaft 42 may be allowed to rotate automatically, following daily instructions from the control device 2, with the daily rotation angles of the second rotational axis A2 stored in advance in the control device 2.

According to this embodiment, the first rotational axis A1 and the second rotational axis A2 are orthogonal to each other and the principal point Q1 of the mirror structure 31 is positioned on the point of intersection between the first rotational axis A1 and the second rotational axis A2. However, the fixed concentrating position can be irradiated with the light of the Sun in the diurnal motion, by implementing the above-described method for setting the rotational axis and just rotating the mirror structure basically about the first rotational axis, with any type of driving mechanism insofar as the driving mechanism has the first driving unit that rotates the mirror about the first rotational axis A1 and the second driving unit that rotates the mirror about the second rotational axis which is perpendicular to the first rotational axis.

Figure 29:
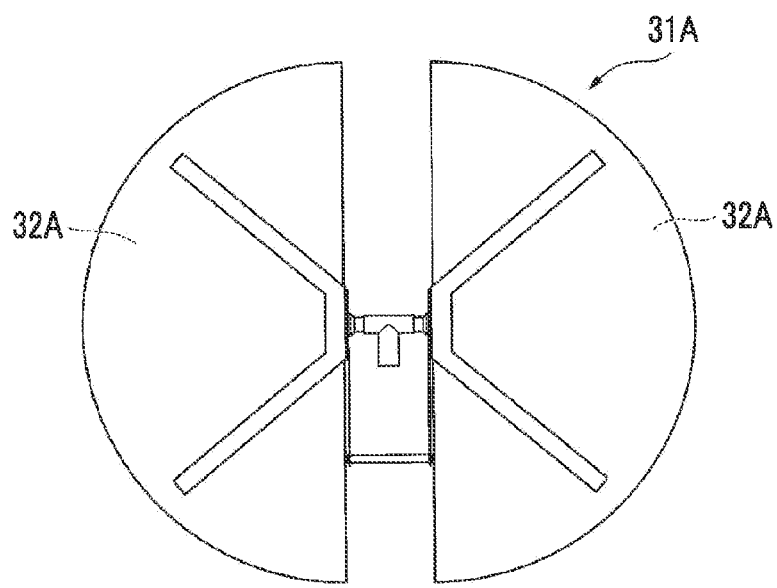
FIG. 29 is a rear view of a mirror structure according to a modification example of the embodiment of the present invention.

The mirror structure 31 that has the two mirrors 32 has been described above as an example of this embodiment. However, the present invention is not limited thereto, and can be applied to a mirror structure that has three or more mirrors. The configuration of the drive device that has the first linear actuator 61 and the 4-link mechanism 62 and the configuration of the supporting base 80 are not limited by the number of the mirrors. In addition, the mirror structure 31 that has the mirror 32 with the oblong plate shape has been described above as an example of this embodiment. However, the present invention is not limited thereto, and the mirror may have another shape, for example, a semi-circular plate shape, as in a mirror structure 31A that has the mirror 32A as illustrated in FIG. 29. In a case where the mirror 32A with the semi-circular plate shape is adopted, interference with an installation surface can be alleviated and the post can be shortened.

Furthermore, the mirrors 32, the rear plates 33, and the support beam member 36 are elastically deformed in the same step in the embodiment described above. However, the rear plate 33 may be bonded to the supporting frame 35 that as the support beam member 36 with the support beam member 36 formed in advance into a shape matching with the desired three-dimensional curved surface relating to the mirror 32.

INDUSTRIAL APPLICABILITY

According to the present invention, the driving force and power consumption to rotate the mirror can be reduced.

REFERENCE SIGNS LIST

Q1 Principal point
Q2 Center of gravity
Ao Optical axis
A1 First rotational axis
A2 Second rotational axis
1 Heat collection apparatus
2 Control device
10 Heat receiver
11 Heat receiving portion
20 Tower facility
30 Heliostat (solar concentrator)
31 Mirror structure
32 Mirror
33 Rear plate 35 Supporting frame
36 Support beam member
37 Connection member
40 Driving mechanism
41 Second driving unit
42 Second rotational shaft
45 Second drive device
46 Second linear actuator
51 First driving unit
52 First rotational shaft
53 First rotational shaft main body
54 T pipe
60 First drive device
61 First linear actuator
62 4-link mechanism
63 First link piece
64 Second link piece
65 Third link piece
66 Fourth link piece
70 Elevation changing structure
71 Turnbuckle
80 Supporting base
82 Post

The invention claimed is:

1. A solar concentrator comprising:
a mirror structure that includes a plurality of mirrors;
a driving mechanism that directs sunlight which is reflected by the plurality of mirrors of the mirror structure to a predetermined concentrating position; and
a supporting base that supports the driving mechanism,
wherein a center of gravity of the mirror structure is located between the plurality of mirrors separated from each other,
wherein the driving mechanism includes a first rotational shaft that has a first rotational axis as a central axis and is supported by the supporting base to be rotatable, a first drive device that rotates the first rotational shaft, a second rotational shaft that has the mirror structure fixed thereto, has a second rotational axis which is orthogonal to the first rotational axis as a central axis, and is mounted on the first rotational shaft to be rotatable, and a second drive device that rotates the second rotational shaft,
wherein the center of gravity of the mirror structure is located in the first rotational shaft or in an extension from the first rotational shaft and in the second rotational shaft or in an extension from the second rotational shaft,
wherein reflective surfaces of the plurality of mirrors of the mirror structure form one rotationally symmetric surface, and a rotationally symmetric axis of the rotationally symmetric surface forms an optical axis of the mirror structure, and
wherein a principal point on the rotationally symmetric surface, through which the optical axis passes, is located on a point of intersection between the first rotational axis and the second rotational axis.

2. The solar concentrator according to claim 1,
wherein the first drive device is arranged at a rear side of the first rotational shaft, in a first rotational axis direction apart from the point of intersection between the first rotational axis and the second rotational axis, and adds a rotational driving force to the first rotational shaft.

3. The solar concentrator according to claim 2,
wherein the driving mechanism has one or more bearings that are arranged in the first rotational axis direction to support the first rotational shaft and are supported by the supporting base, and support the first rotational shaft to be rotatable, and
wherein the first drive device is arranged at a rear side than at least one of the one or more bearings, and adds the rotational driving force to the first rotational shaft.

4. The solar concentrator according to claim 3,
wherein the driving mechanism further includes a front bearing that supports on a front side which is close to the point of intersection of first and second rotational axes to be rotatable in the first rotational shaft, and a rear bearing that supports on the rear side to be rotatable, and
wherein the first drive device is arranged at a rear side than an end of the rear bearing on the front side, and adds the rotational driving force to the first rotational shaft.

5. The solar concentrator according to claim 4, further comprising a rear bearing support member that is mounted on the supporting base to support the rear bearing.

6. The solar concentrator according to claim 1,
wherein the first rotational shaft has a hollow pipe whose center line is the first rotational axis.

7. The solar concentrator according to claim 1,
wherein the second drive device is arranged in a radiation direction apart from the point of intersection between the first rotational axis and the second rotational axis.

8. The solar concentrator according to claim 1,
wherein the center of gravity of the mirror structure is located on a vertically extended line of the supporting base.

9. The solar concentrator according to claim 1,
wherein the supporting base has a frusto-conical shape.

10. The solar concentrator according to claim 1,
wherein the supporting base has a frusto-conical shape, and
wherein the center of gravity of the mirror structure is located in a vertically extended line of a lower surface of the supporting base.

11. The solar concentrator according to claim 9,
wherein the supporting base further includes a rib that is arranged along a generatrix of base.

12. The solar concentrator according to claim 1,
wherein the first drive device has:
an actuator as a drive source that has a rod cover and a rod which is linearly driven along to the rod cover; and
a link mechanism that has a connection to the rod and the other connection to the first rotational shaft, and drives the first rotational shaft to be rotated by the linear driving of the rod.

13. The solar concentrator according to claim 12,
wherein the link mechanism is a 4-link mechanism that has a first link piece, a second link piece, a third link piece, and a fourth link piece which are connected with each other,
wherein one end of the first link piece is connected to the first rotational shaft to rotate each other,
wherein one end of the second link piece is connected to the other end of the first link piece to rotate each other,
wherein one end of the third link piece is connected to the other end, hereafter second end, of the second link piece to rotate each other,
wherein one end of the fourth link piece is connected to the other end of the third link piece to rotate each other, and the other end of the fourth link piece is connected to the first rotational shaft not to rotate each other, wherein the first link piece is fixed to a non-operating part, the rod cover of the actuator is mounted on the non-operating part to rotate each other, and one end of the rod of the actuator is connected to the second end of the second link piece to rotate each other, and wherein a distance from the one end to the other end of the fourth link piece is shorter than a distance from the one end to the other end of the second link piece.

14. The solar concentrator according to claim 13, wherein the second link piece is bent such that a middle portion between the one end and the other end of the second link piece is arranged in the direction away from the first rotational shaft against a line connecting the one end to the other end.

15. The solar concentrator according to claim 1, wherein the second drive device has an actuator as a drive source that has a rod cover and a rod which is linearly driven along to the rod cover, and wherein the rod cover is mounted on the first rotational shaft to rotate each other such that a linear driving direction of the rod is a direction perpendicular to the second rotational axis, and an end of the rod is mounted on a position in the radiation direction apart from the second rotational axis in the mirror structure to rotate each other.

16. The solar concentrator according to claim 1, further comprising an elevation changing structure that changes an angle of the first rotational shaft with respect to a horizontal plane.

17. The solar concentrator according to claim 16, wherein the second drive device has a predetermined rotation angle range of the second rotational shaft based on the first rotational shaft, and wherein the elevation changing structure changes the angle of the first rotational shaft with respect to the horizontal plane between a face-down state where one side of the first rotational shaft is not higher than the other side and a state where the one side is higher than the other side.

18. The solar concentrator according to claim 1, wherein the mirror structure further includes, along with the plurality of mirrors, rear plates that support respective back surfaces of the plurality of mirrors and a supporting frame that supports back surfaces of the rear plates, and wherein the reflective surfaces of the plurality of mirrors of the mirror structure form the one plane of rotational symmetry, the axis of rotational symmetry of the plane forms the optical axis of the mirror structure, and the supporting frame has a plurality of support beam members that extend in the radiation direction with respect to the optical axis to support the rear plates.

19. A solar concentrator comprising:

a mirror structure that includes a plurality of mirrors; and a driving mechanism that rotates the mirror structure respectively about a first rotational axis and a second rotational axis which are orthogonal to each other, wherein the driving mechanism includes a first rotational shaft that has the first rotational axis as a central axis to be rotatable, a second rotational shaft that has the mirror structure fixed thereto, and is mounted on the first rotational shaft such that the second rotational shaft has the second rotational axis as a central axis to be rotatable, and a drive device that rotates each of the first rotational shaft and the second rotational shaft, wherein sunlight is reflected by the mirrors of the mirror structure, and the sunlight is collected at a predetermined concentrating position by a heat collector, wherein the mirror structure further includes, along with the plurality of mirrors separated from each other, rear plates that support respective back surfaces of the plurality of mirrors and a supporting frame that supports back surfaces of the rear plates, wherein reflective surfaces of the plurality of mirrors of the mirror structure form one rotationally symmetric surface, and a rotationally symmetric axis of the rotationally symmetric surface forms an optical axis of the mirror structure, wherein the supporting frame has a plurality of support beam members that extend in a radiation direction with respect to the optical axis to support the rear plates, and a connection member that connects the support beam members with each other, and wherein the connection member includes the second rotational shaft.

20. The solar concentrator according to claim 19, wherein a point of intersection between the first rotational axis and the second rotational axis is positioned on a point of the rotationally symmetric surface through which the optical axis passes.

21. The solar concentrator according to claim 19, wherein a center of gravity of the mirror structure is positioned in the first rotational shaft or in an extension from the first rotational shaft and in the second rotational shaft or in an extension from the second rotational shaft.

22. The solar concentrator according to claim 18, wherein the mirror forms a polygonal plate shape, and the support beam member extends from the optical axis toward a corner of the mirror.

23. The solar concentrator according to claim 18, wherein a cross-sectional area of the support beam member that is perpendicular to the radiation direction, in which the support beam member extends, at a position away from the optical axis is smaller than a cross-sectional area at a position close to the optical axis.

24. The solar concentrator according to claim 1, wherein the center of gravity of the mirror structure is positioned on the optical axis.

25. A heat collection apparatus comprising:

the solar concentrator according to claim 1; and a heat receiver that heats a medium with sunlight which is collected by the solar concentrator.

26. A solar thermal power generation apparatus comprising:

the solar concentrator according to claim 1;

a heat receiver that heats a medium with sunlight which is collected by the solar concentrator;

a turbine that is driven by the medium which is heated by the heat receiver; and a power generator that generates power when the turbine is driven.

* * * * *